(12) United States Patent
Cabrera

(10) Patent No.: US 9,687,017 B1
(45) Date of Patent: Jun. 27, 2017

(54) CACTUS PROCESSING SYSTEM

(71) Applicant: Adrian C. Cabrera, North Las Vegas, NV (US)

(72) Inventor: Adrian C. Cabrera, North Las Vegas, NV (US)

(*) Notice: Subject to any disclaimer, the term of this patent is extended or adjusted under 35 U.S.C. 154(b) by 56 days.

(21) Appl. No.: 14/855,953

(22) Filed: Sep. 16, 2015

(51) Int. Cl.
*A23N 15/02* (2006.01)
*A23N 7/00* (2006.01)

(52) U.S. Cl.
CPC .......... *A23N 7/00* (2013.01); *A23N 2007/007* (2013.01)

(58) Field of Classification Search
CPC ..... A23N 17/00; A23N 7/00; A01G 2005/005
USPC .......... 99/539–546, 584, 588–599, 486–492, 99/600–643; 426/481–483
See application file for complete search history.

(56) References Cited

U.S. PATENT DOCUMENTS

| | | | |
|---|---|---|---|
| 1,394,162 A | 10/1921 | Gebhardt | |
| 3,060,842 A * | 10/1962 | Nord | A61K 36/88 100/37 |
| 4,240,902 A | 12/1980 | Agee et al. | |
| D296,560 S | 7/1988 | Alexandersen et al. | |
| 5,196,036 A | 3/1993 | Lamas | |
| 5,293,714 A | 3/1994 | Bouchard et al. | |
| 5,454,300 A * | 10/1995 | Rainey | A23N 4/12 99/537 |
| 5,495,796 A * | 3/1996 | Mueller | A23N 17/008 99/567 |
| 5,651,212 A | 7/1997 | Jensen | |
| 6,016,626 A | 1/2000 | Auer et al. | |
| 6,401,341 B1 * | 6/2002 | Hernandez | B26B 9/00 30/136 |
| 6,796,224 B2 | 9/2004 | Ascari et al. | |
| 2005/0266141 A1 * | 12/2005 | Agarwala | A61K 36/33 426/615 |
| 2006/0096470 A1 * | 5/2006 | Baek | A23N 7/02 99/584 |

FOREIGN PATENT DOCUMENTS

| | | | | |
|---|---|---|---|---|
| KR | 20010090192 A * | 10/2001 | | |
| MX | WO 2005011941 A1 * | 2/2005 | | A23N 7/00 |
| MX | WO2012067476 A1 * | 5/2012 | | |
| MX | WO 2012158006 A1 * | 11/2012 | | A23N 15/06 |

* cited by examiner

*Primary Examiner* — Thien S Tran

(57) ABSTRACT

A cactus processing system for removing spines from cactus stems features a free-standing edge cleaning member. The system features a free-standing conveyor member comprising a lower transport conveyor with a high open area mesh lower transport conveyor belt located on the lower transport conveyor. A lower cleaning conveyor is located entirely inside a lower transport conveyor open middle area. A lower brushing belt is located on the lower cleaning conveyor. The system features the free-standing conveyor member comprising an upper transport conveyor with a high open area mesh upper transport conveyor belt located on the upper transport conveyor. An upper cleaning conveyor is located entirely inside an upper transport conveyor open middle area. An upper brushing belt is located on the upper cleaning conveyor. The system features an open basin located on a ground surface underneath the conveyor member.

8 Claims, 25 Drawing Sheets

(ISO View)

(Detail View)

(ISO View)

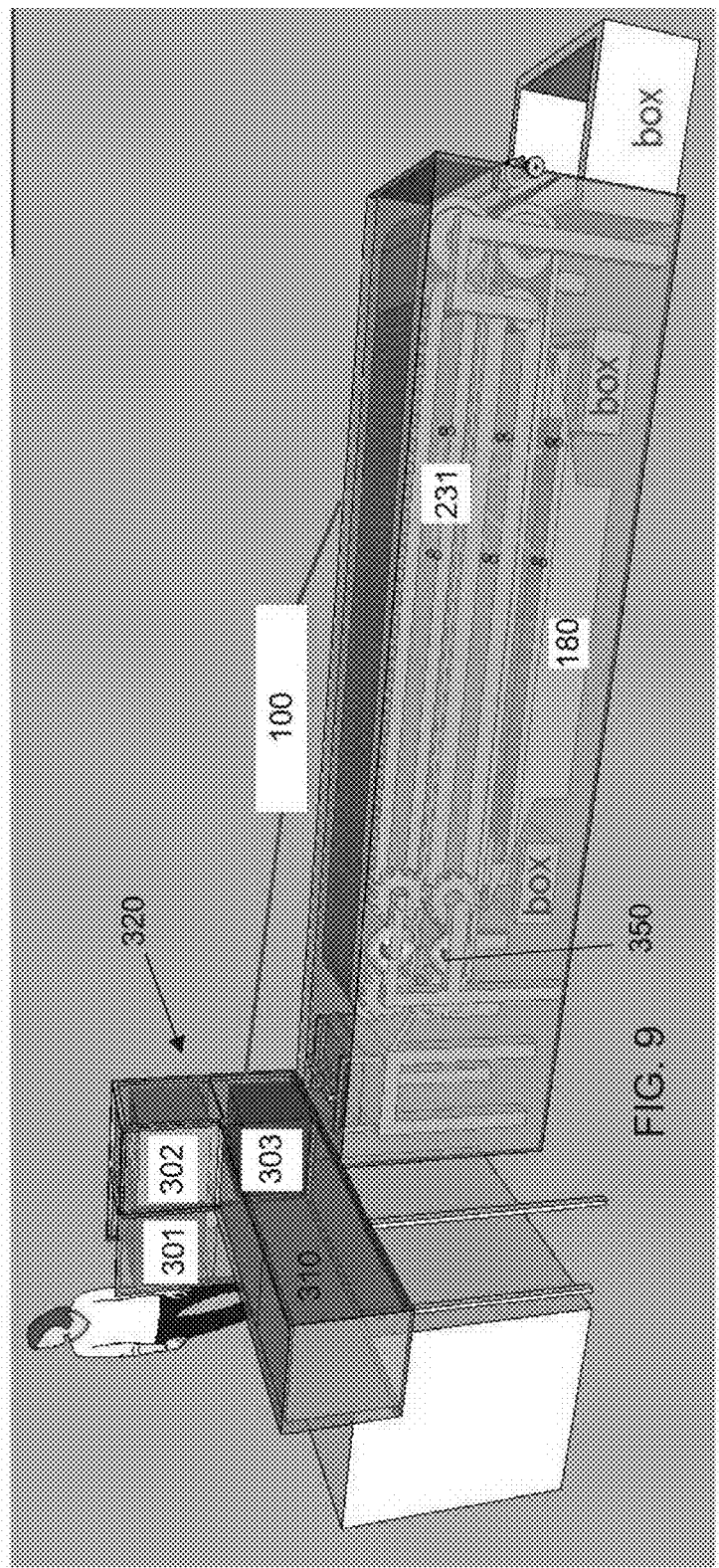

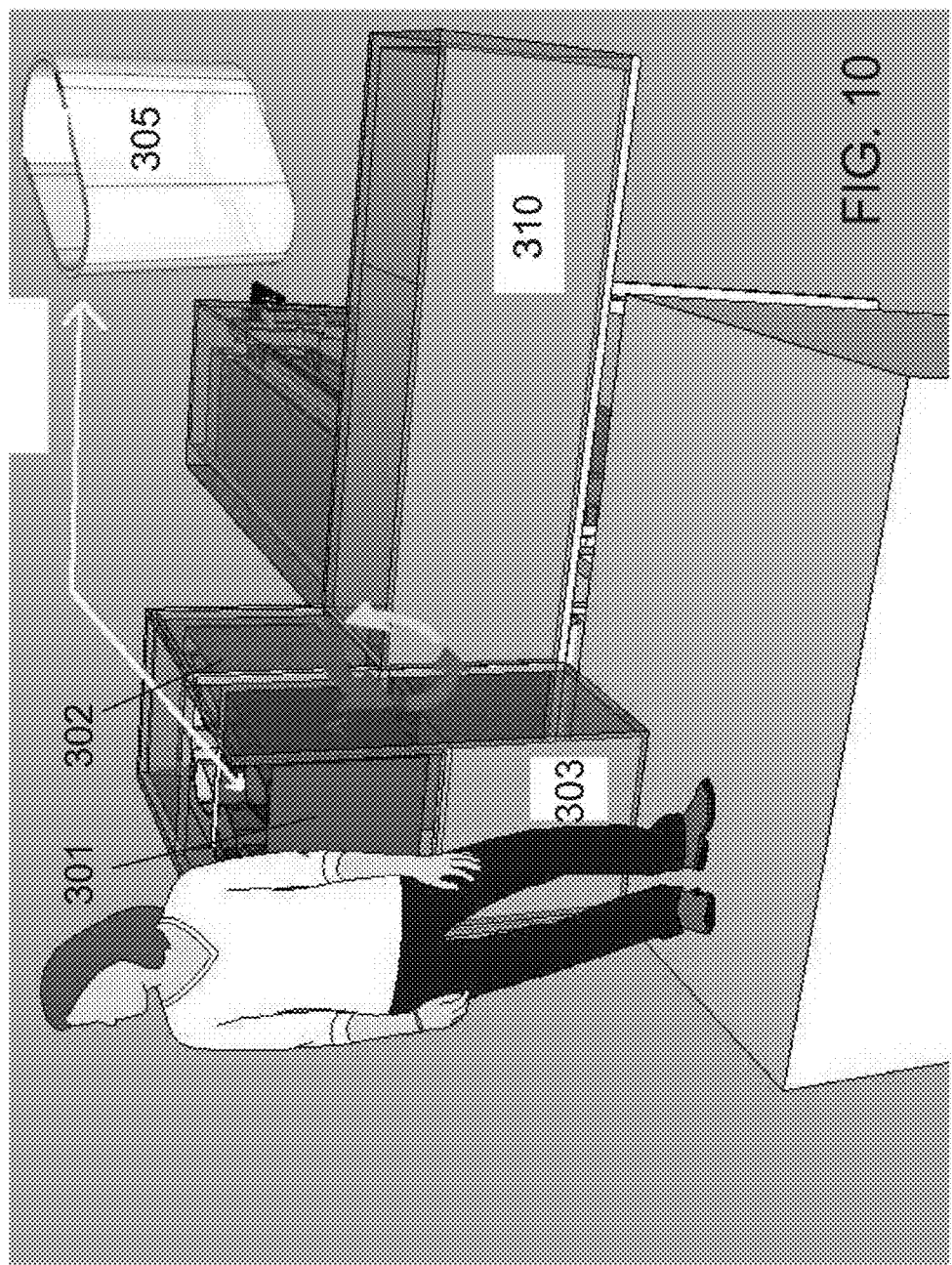

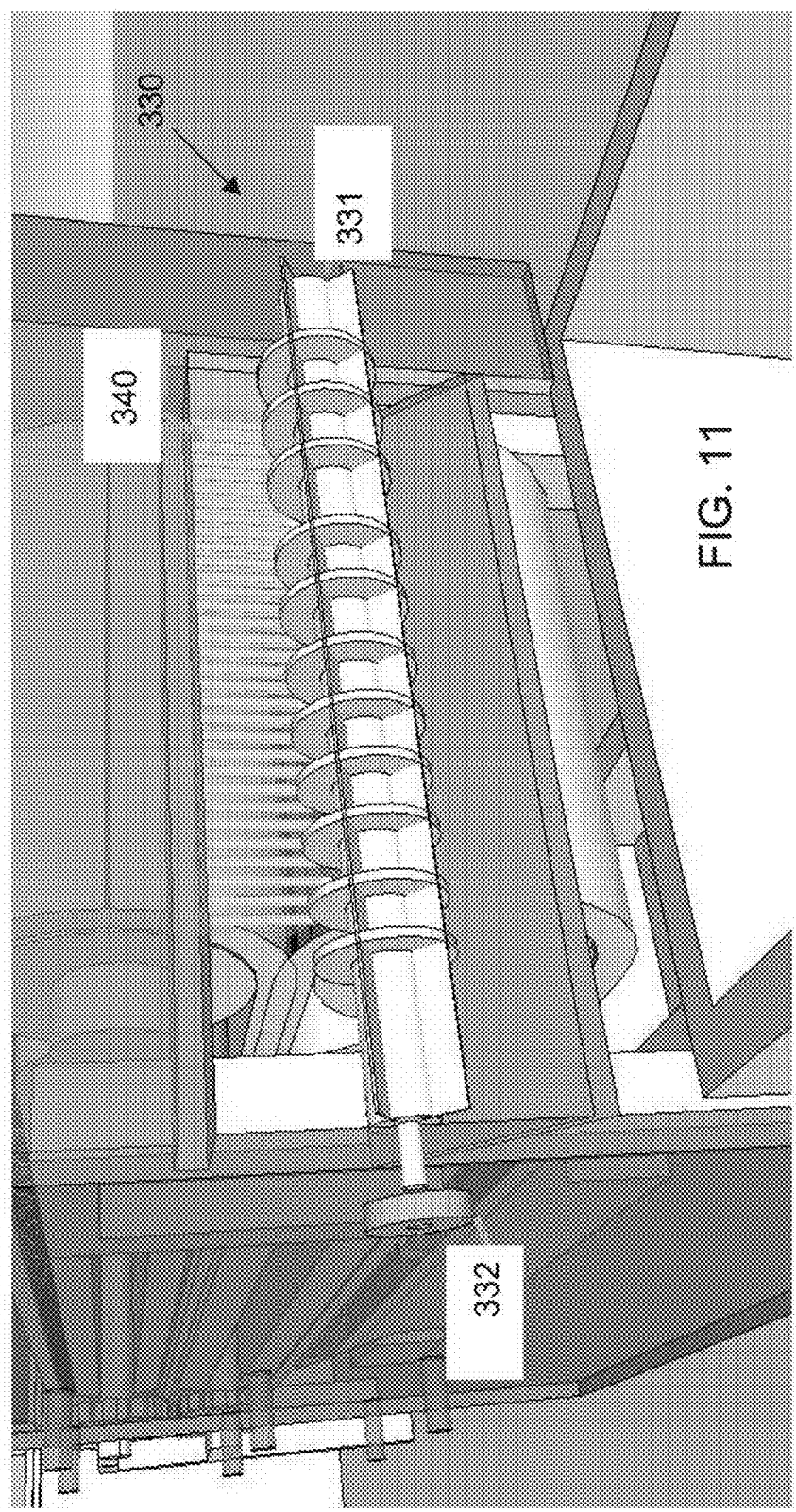

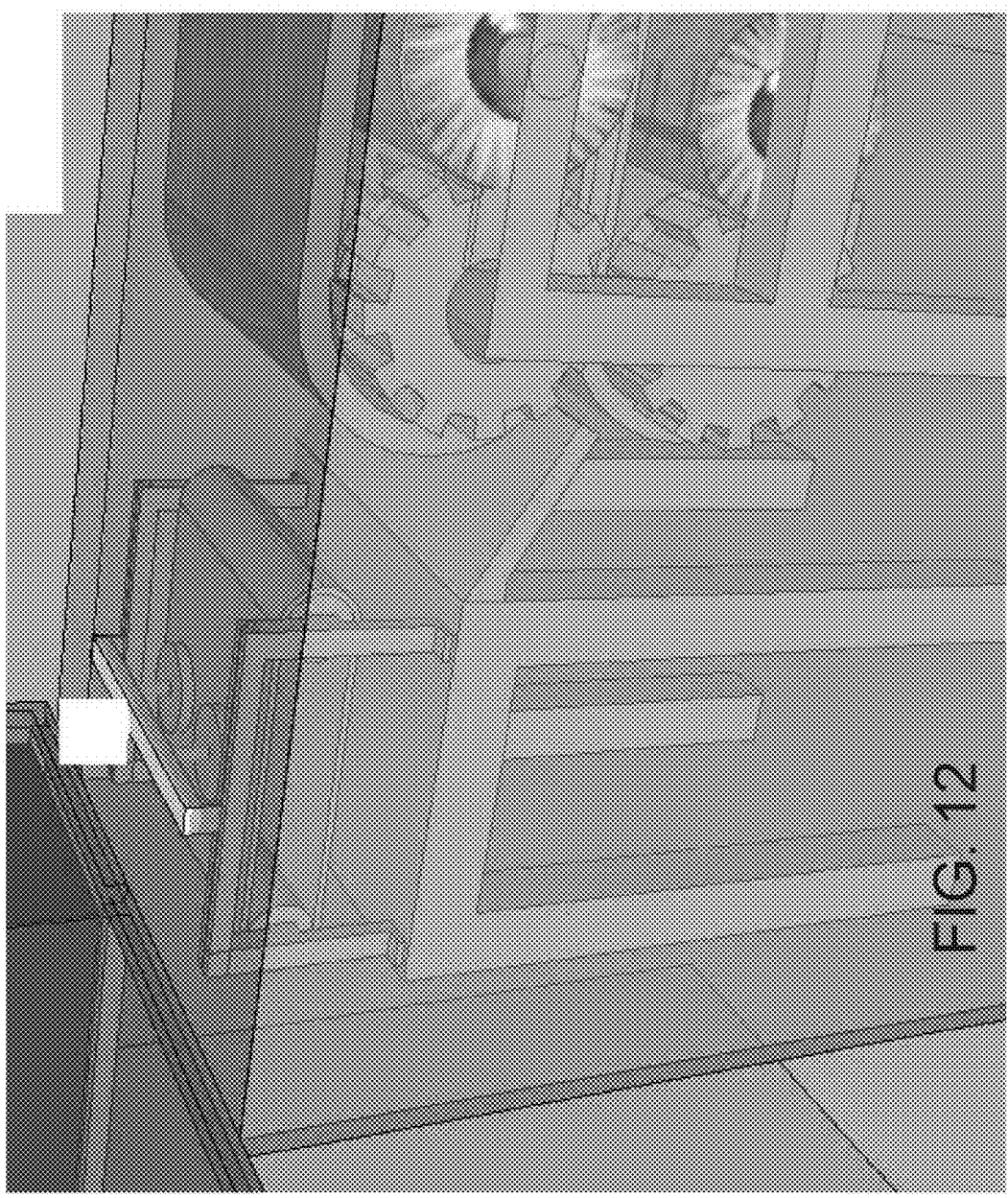

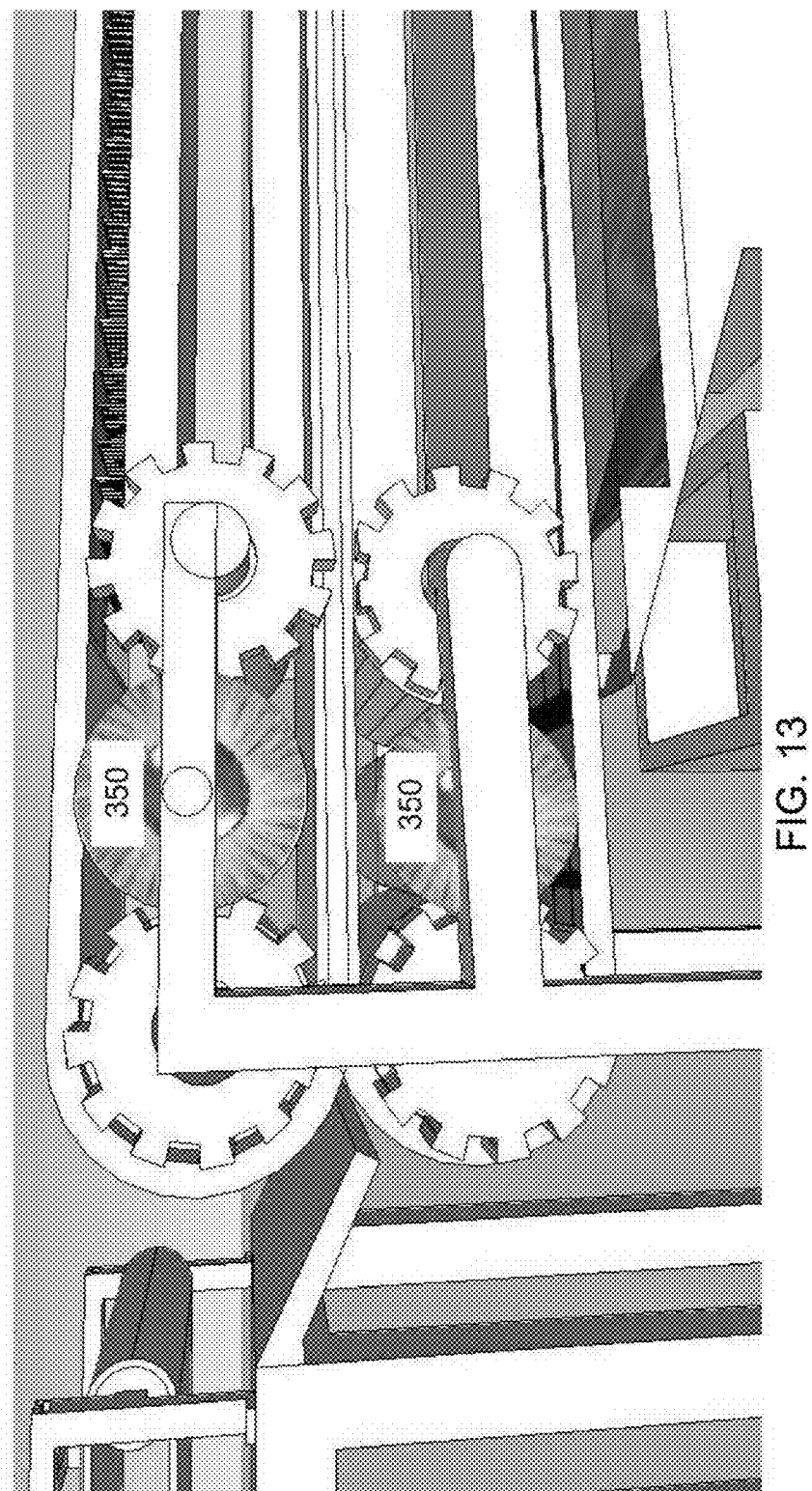

CACTUS PROCESSING SYSTEM

FIELD OF THE INVENTION

The present invention relates to systems for processing cactus for food consumption.

BACKGROUND OF THE INVENTION

The parts of a cactus plant including the flowers and the stems have been used for centuries as a food source for mankind and animals. A problem exists, however, in that it can be difficult or time consuming to remove the spines from the cactus stems before consumption. The present invention features a cactus processing system for removing spines from cactus stems.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a cactus processing system for removing spines from cactus stems. In some embodiments, the system comprises a free-standing edge cleaning member. In some embodiments, the edge cleaning member is designed to remove cactus spines from an outer edge of a cactus stem.

In some embodiments, the system comprises a free-standing conveyor member comprising a lower transport conveyor. In some embodiments, a high open area mesh lower transport conveyor belt is located on the lower transport conveyor and surrounds a lower transport conveyor open middle area. In some embodiments, the lower transport conveyor is designed to transport the cactus stem from a lower transport conveyor first end to a lower transport conveyor second end. In some embodiments, the lower transport conveyor belt is designed to provide support to the cactus stem while providing access to at least ninety percent of a cactus stem rear surface area via a lower transport conveyor belt open area.

In some embodiments, a lower cleaning conveyor is located entirely inside the lower transport conveyor open middle area. In some embodiments, a lower brushing belt is located on the lower cleaning conveyor. In some embodiments, the lower brushing belt is designed to interface with a cactus stem rear surface on the lower transport conveyor belt to remove cactus spines. In some embodiments, the lower brushing belt traverses a direction opposed to the lower transport conveyor belt.

In some embodiments, the system comprises a free-standing conveyor member comprising an upper transport conveyor. In tome embodiments, a high open area mesh upper transport conveyor belt is located on the upper transport conveyor and surrounds an upper transport conveyor open middle area. In some embodiments, the upper transport conveyor is designed to transport the cactus stem from the upper transport conveyor first end to the upper transport conveyor second end. In some embodiments, the upper transport conveyor belt is designed to provide support to the cactus stem while providing access to at least ninety percent of a cactus stem front surface area via the upper transport conveyor belt open area.

In some embodiments, an upper cleaning conveyor is located entirely inside the upper transport conveyor open middle area. In some embodiments, an upper brushing belt is located on the upper cleaning conveyor. In some embodiments, the upper brushing belt is designed to interface with a cactus stem front surface on the upper transport conveyor belt to remove cactus spines. In some embodiments, the upper brushing belt traverses a direction opposed to the upper transport conveyor belt.

In some embodiments, an upper surface of the lower transport conveyor belt is moving a same direction as a lower surface of the upper transport conveyor belt. In some embodiments, the cactus stem is held between the lower transport conveyor belt and the upper transport conveyor belt. In some embodiments, needles from the cactus stem are removed via the lower brushing belt and the upper brushing belt. In some embodiments, the lower brushing belt and the upper brushing belt each comprise a plurality of U-shaped brushes located thereon.

In some embodiments, the system comprises an open basin located on a ground surface. In some embodiments, the basin comprises a rail longitudinally located over an open basin top from a basin first end to a basin second end. In some embodiments, a mesh screen is slidably located on the rail. In some embodiments, the mesh screen sets in the basin perpendicularly for straining solids from collected sludge. In some embodiments, the solids are driven out of the basin on the basin first end or the basin second end via manual manipulation of the mesh screen.

In some embodiments, the system comprises a first collecting box located on the ground surface next to the basin first end and a second collecting box located on the ground surface next to the basin second end. In some embodiments, the first collecting box and the second collecting box are designed to catch the solids removed from the basin.

In some embodiments, the system comprises a cactus collecting box located on the ground surface next to the lower conveyor member second end. In some embodiments, the cactus collecting box is designed to collect cleaned cactus stems falling from the conveyor member.

In some embodiments, the system comprises a compressed air cleaning system comprising a compressed air supply and a plurality of compressed air nozzles. In some embodiments, the plurality of nozzles is located in multiple locations within a lower brushing belt middle area and an upper brushing belt middle area for cleaning the lower brushing belt, the upper brushing belt, the lower transport conveyor belt, and the upper transport conveyor belt.

BRIEF DESCRIPTION OF THE DRAWINGS

FIG. 9 shows a perspective view of the present invention. The machine can be partially or completely encapsulated to prevent an accident with the expulsion of cactus spines.

FIG. 10 shows a perspective view of the cactus loader of the present invention. The green box indicates moving parts and is in the process of placing the cactus in edge-cleaning member. The yellow box is stopped and empty on the side of the cactus loader and ready for when the red box staff is filled. A person proceeds to fill the red box with the yellow box color yellow, and finally the red box is stopped. The person fills an area with the cactus loader. The mechanism for filling and for removing and placing of the cactus of in the area of edge-cutting member is shown.

FIG. 11 shows a perspective view of the dicing, cutting, shredding, or chopping system of the present invention. By turning a knob of a roller, an elaborate product is obtained by chopping or slicing the cactus.

FIG. 12 shows a perspective view of the rotating brushes and the edge cleaning member of the present invention. The rotating brushes can clean the conveyor belts.

FIG. 13 shows a side view of the rotating brushes of the present invention.

DESCRIPTION OF PREFERRED EMBODIMENTS

Figure 1:
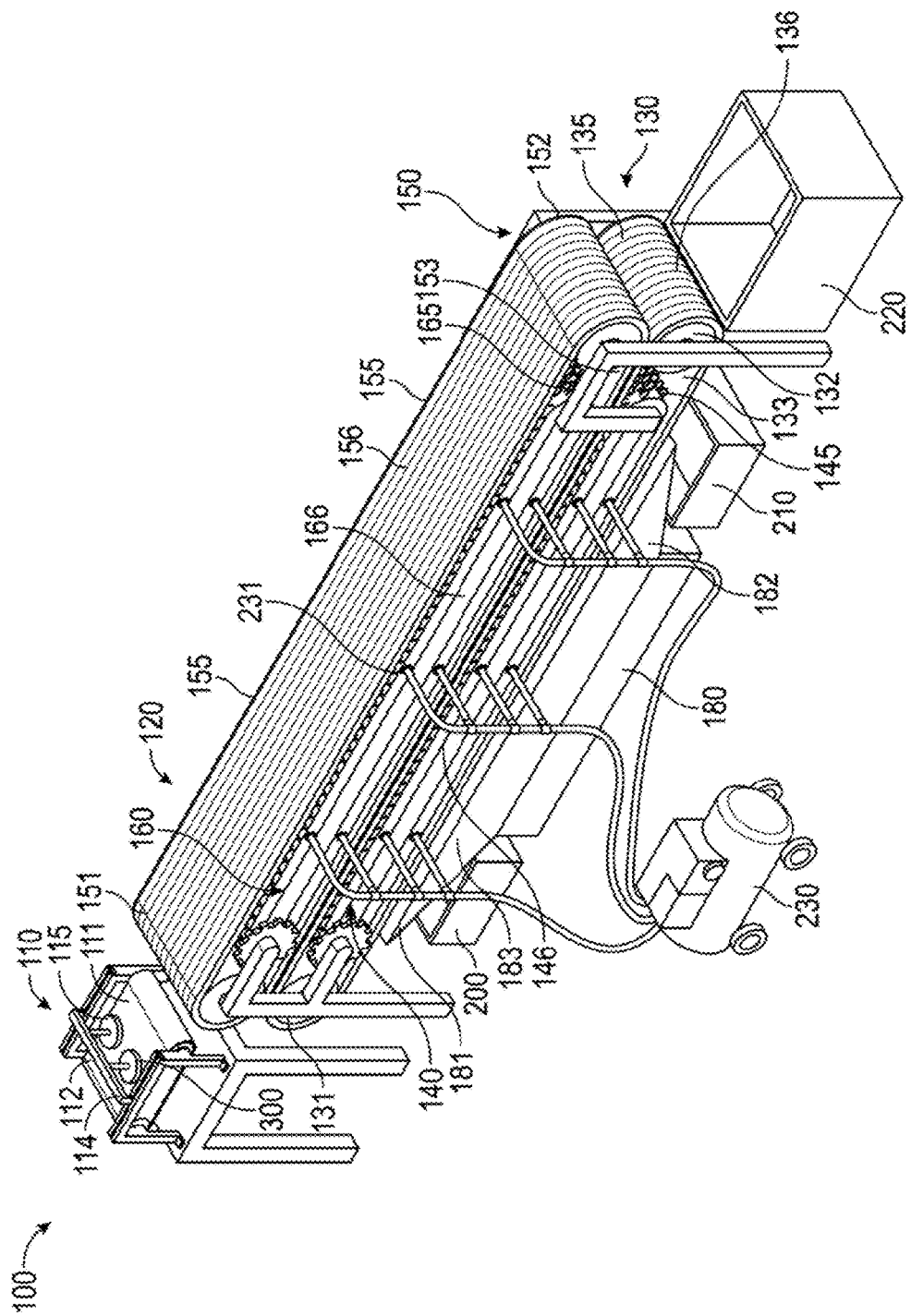
FIG. 1 shows a perspective view of the present invention. In this embodiment, the brushes are round and U-shaped and arranged in rows that are offset, i.e. zig-zag, from each other.
Figure 2:
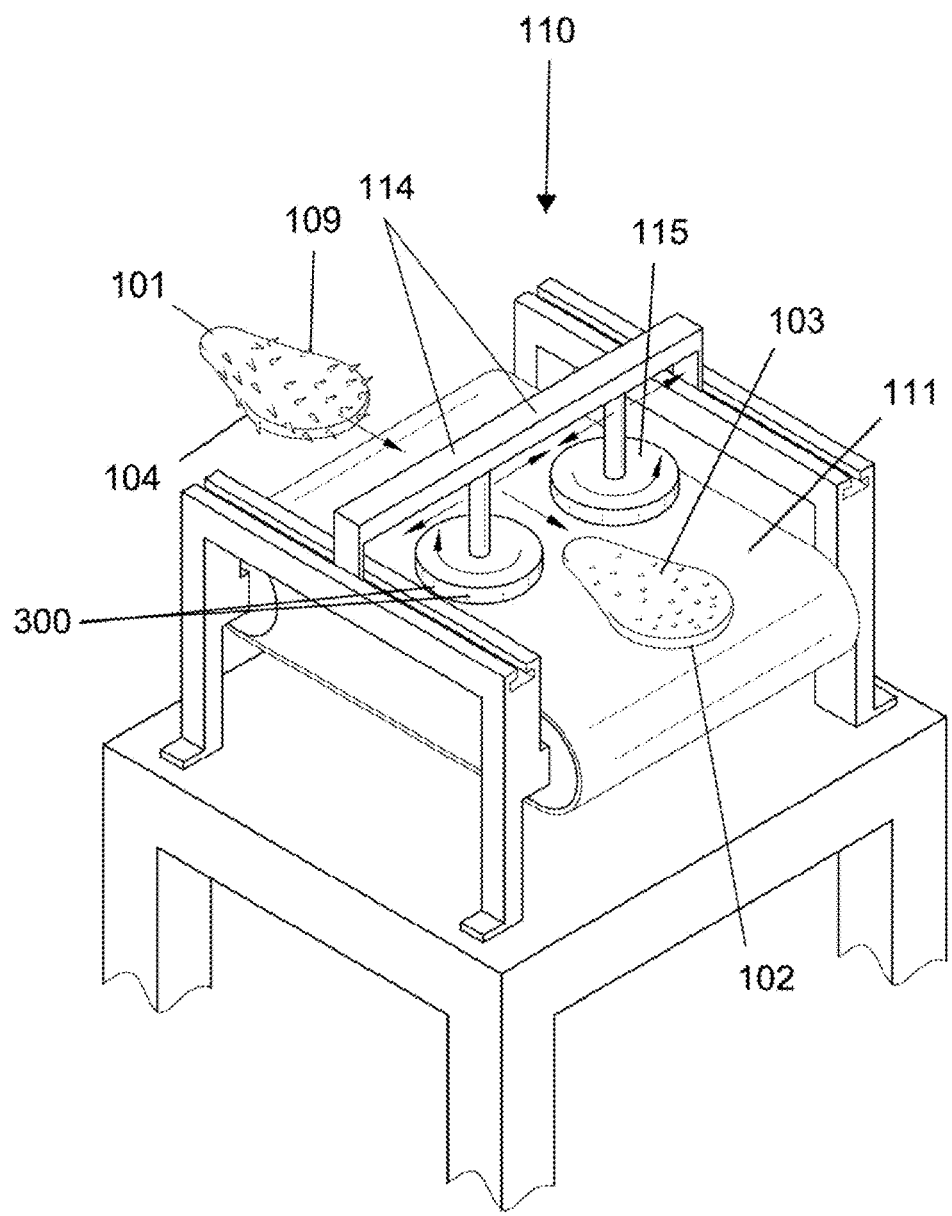
FIG. 2 shows a perspective view of the edge cleaning member of the present invention.
Figure 3:
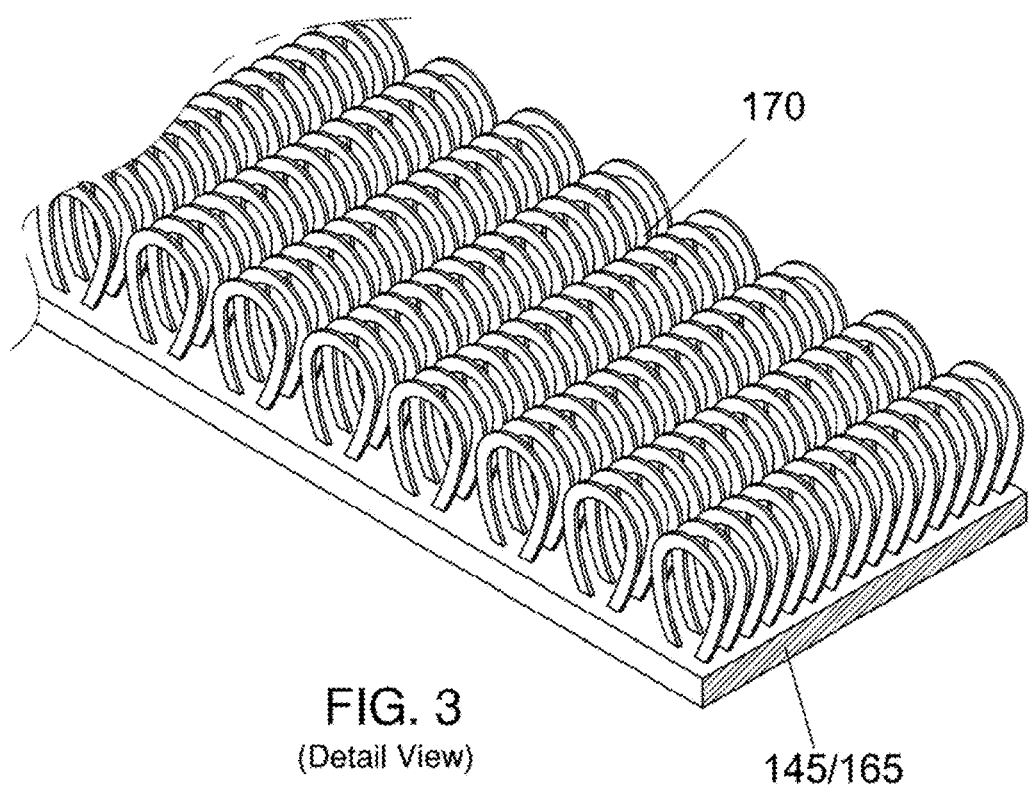
FIG. 3 shows a close-up view of the upper/lower brushing belt of the present invention. The brushes are U-shaped and arranged in aligned rows.
Figure 4:
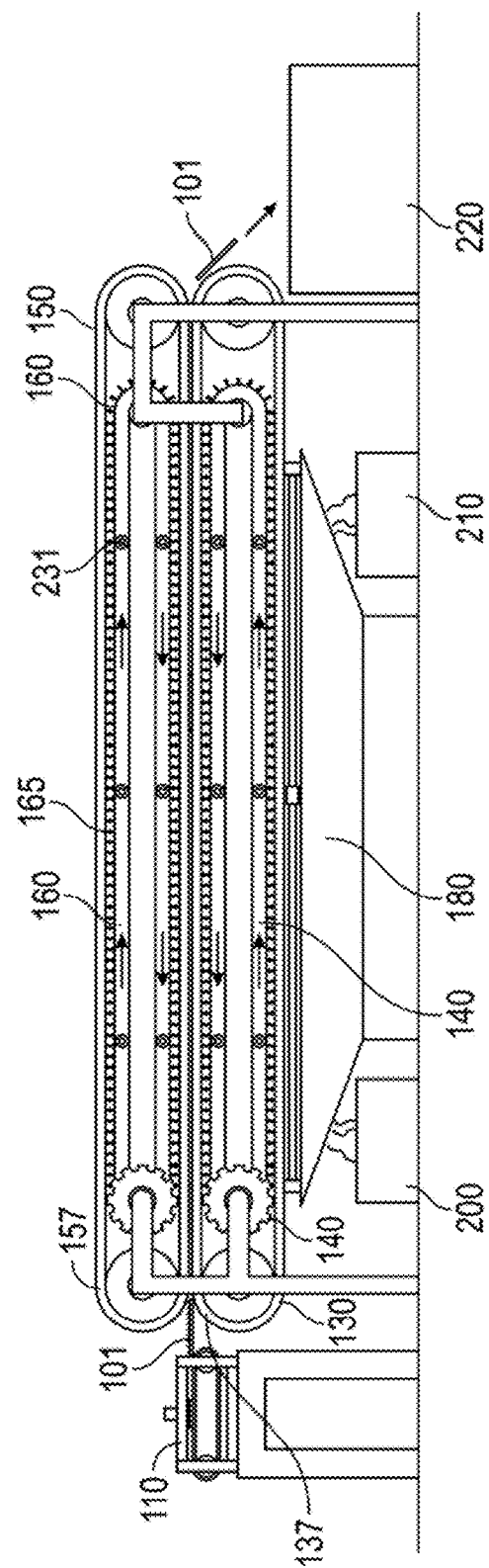
FIG. 4 shows a side view of the present invention.
Figure 5:
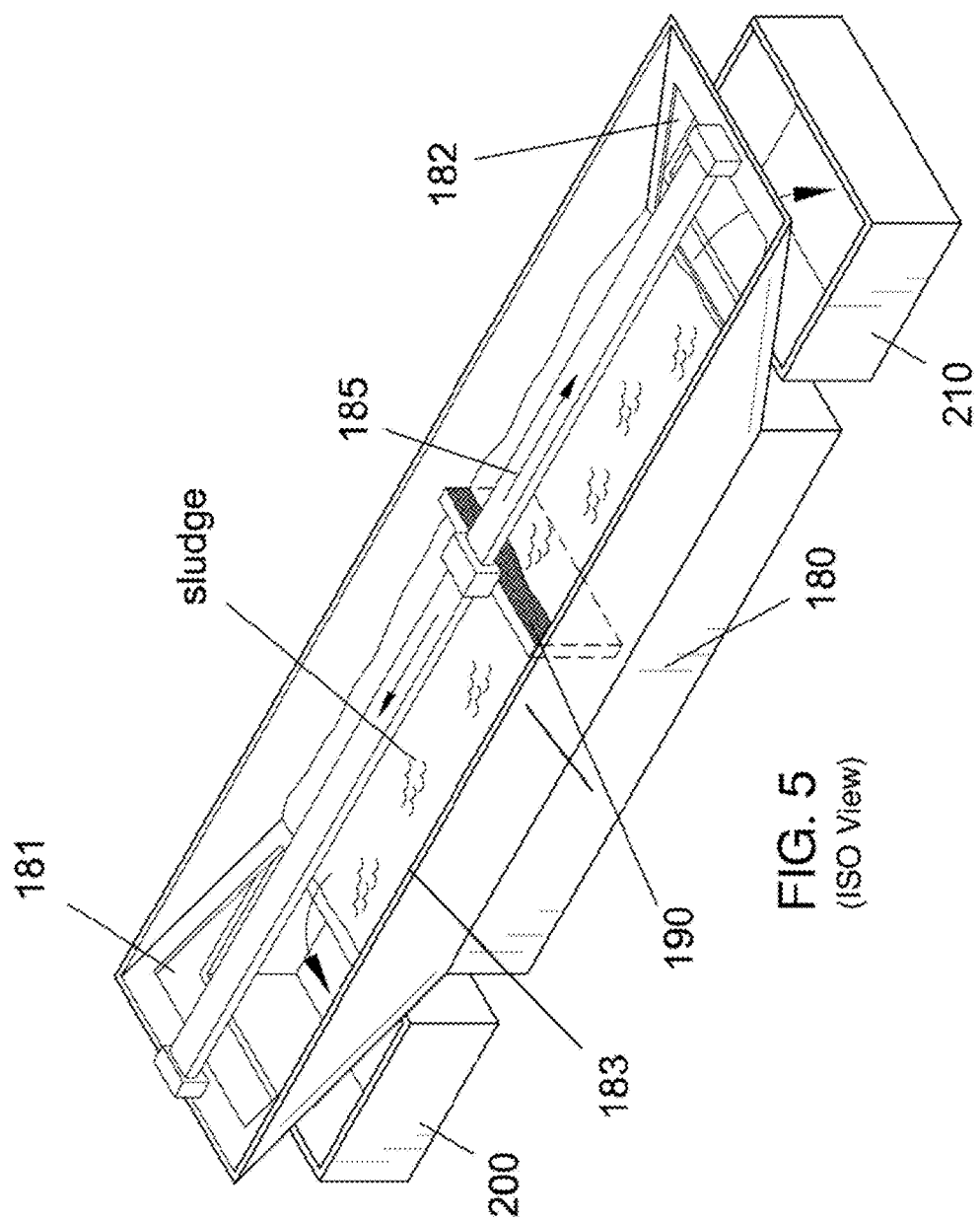
FIG. 5 shows a perspective view of the basin of the present invention. The basin may be located on the bottom of the machine. The basin can hold water, which helps catch thorns. A mesh screen maintains the water by screening cactus thorns from the water, which allows for the water to be used later in washing and maintenance of the machine.
Figure 6:
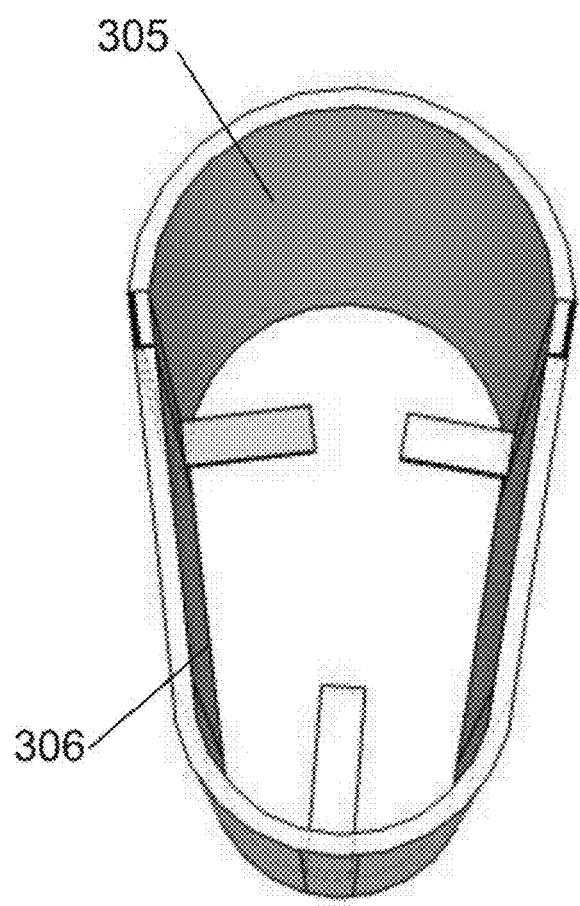
FIG. 6 shows a perspective view of the stem tube of the present invention. This is part of the loading mechanism that will carry the cactus pads to be placed in the edge-cleaning member in order to continue with the next cleaning process.
Figure 7:
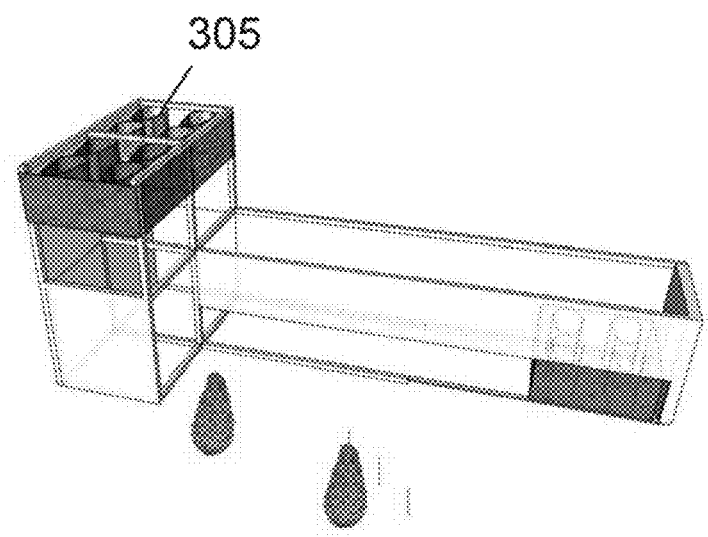
FIG. 7 shows a perspective view of the cactus loader of the present invention. The cactus loader can deposit the cactus on the respective edge-cleaning member, in order to get more product in less time.
Figure 8A:
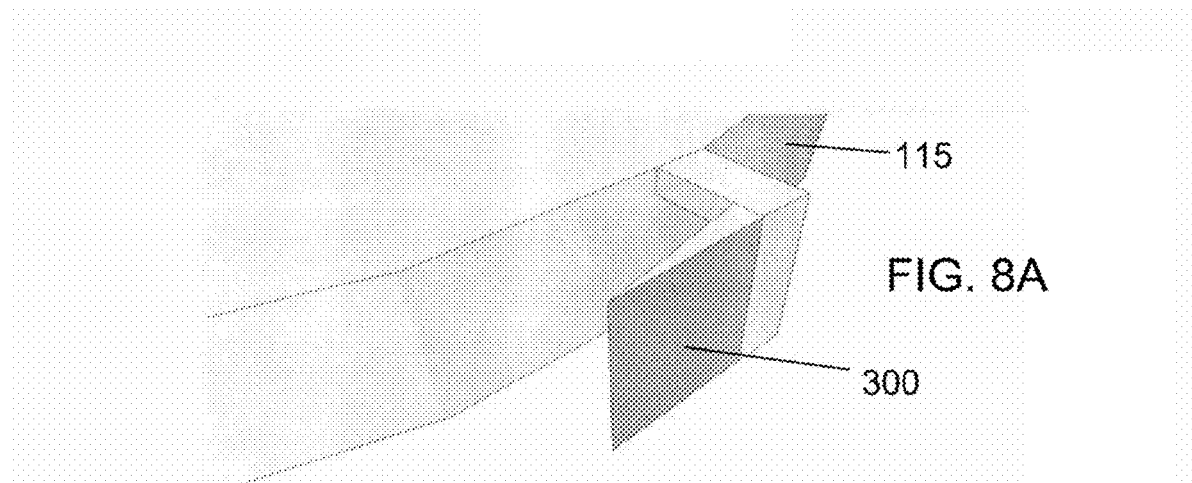
FIG. 8A shows a perspective view of the knife of the present invention.
Figure 8B:
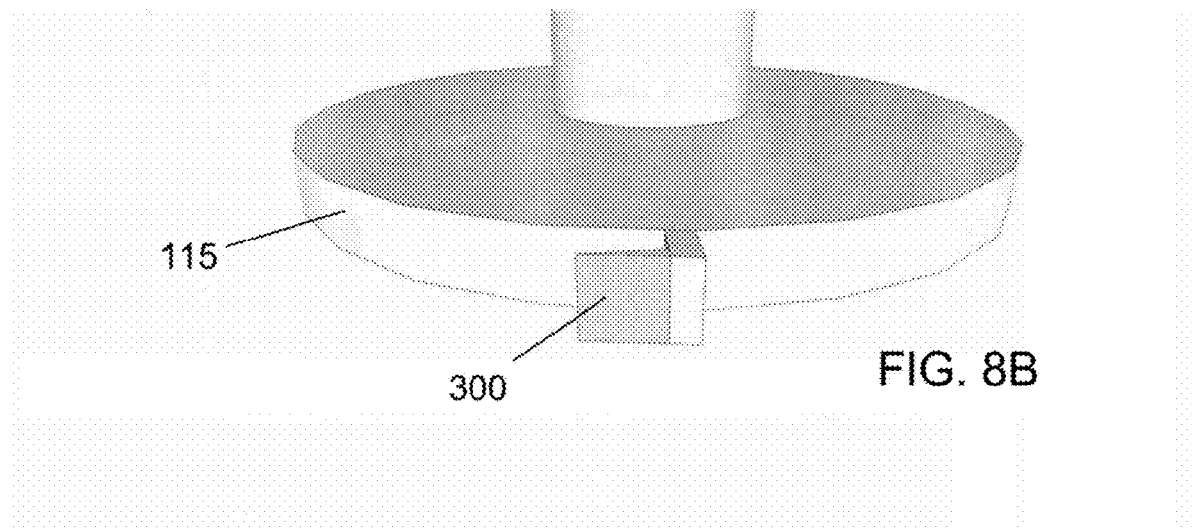
FIG. 8B shows a perspective view of the wheel and knife of the present invention. The knife can cut a few millimeters off of the cactus edges.
Figure 14:
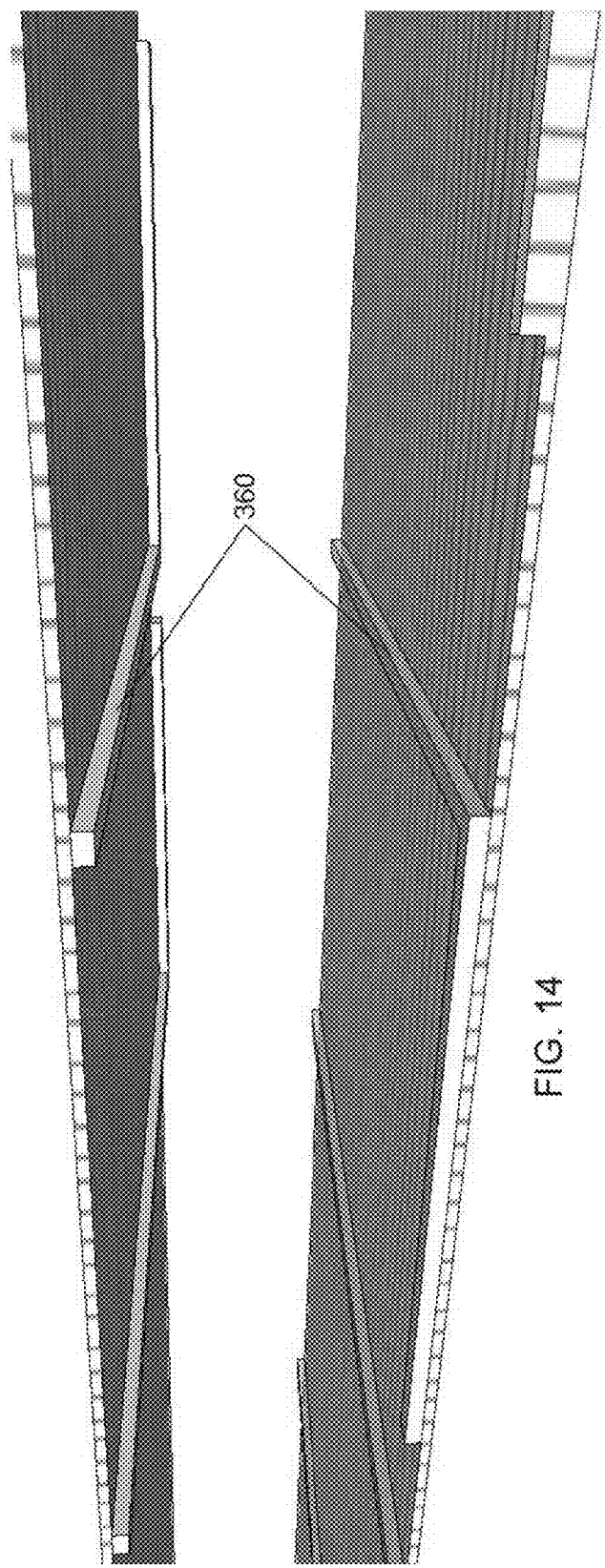
FIG. 14 shows a perspective view of the angular ledge of the present invention, with one on a surface of each belt for holding the cactus stem in position. The conveyor belts and angular ledge are shown in the part of cells and are displayed in the same way on the lower and upper belts to form the cell for protecting the cactus.
Figure 15:
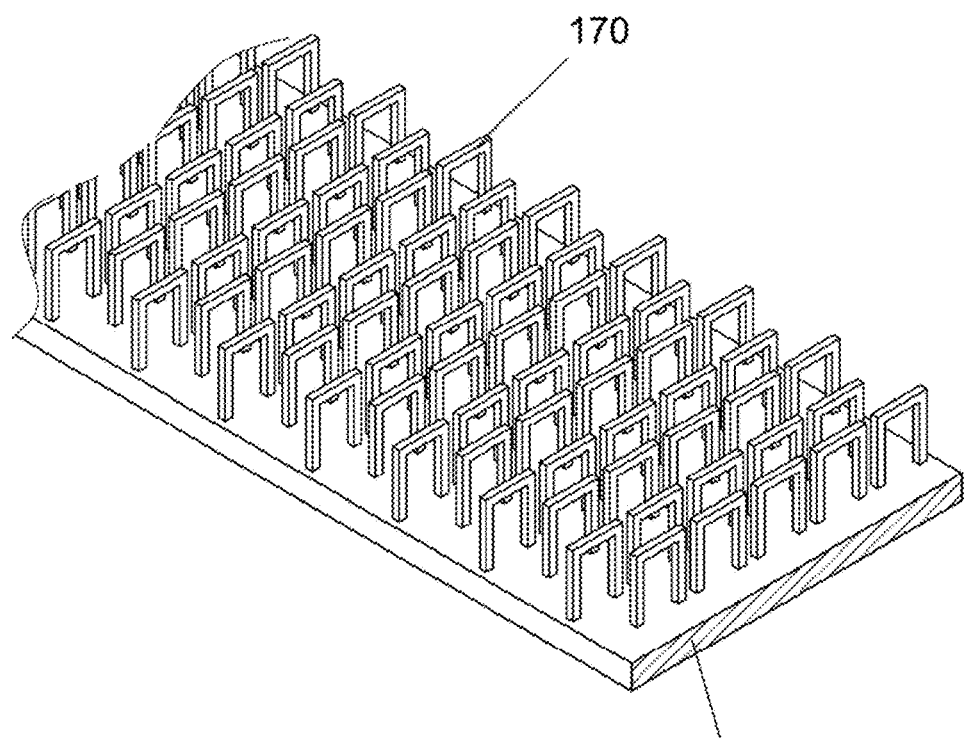
FIG. 15 shows an alternate embodiment of the brush of the present invention in a rectangular form.
Figure 16:
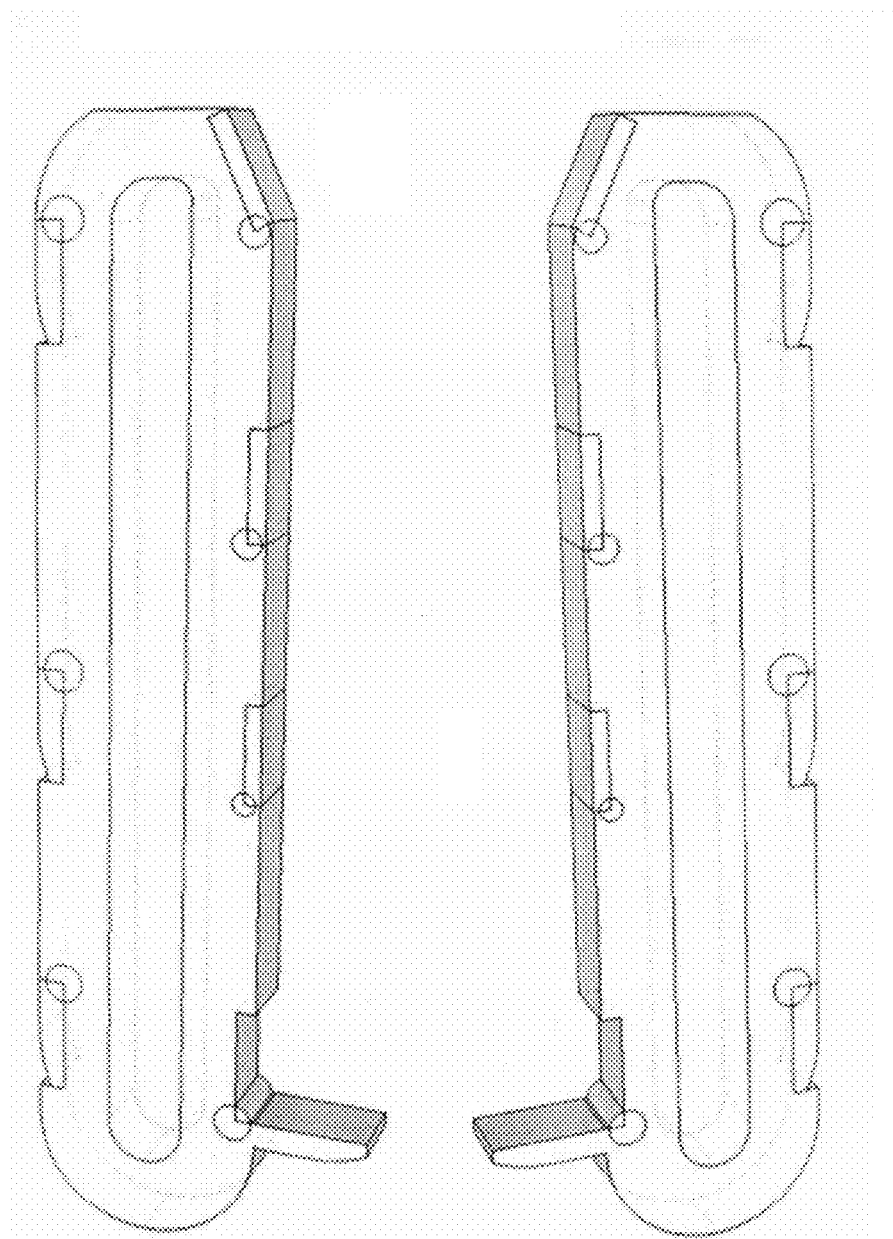
FIG. 16 shows a device of the present invention featuring gravity actuated pivoting ledges. In one embodiment, the inside of the cactus-loader is similar to a chain mechanism which drives the three edges as shown in FIG. 6.
Figure 17:
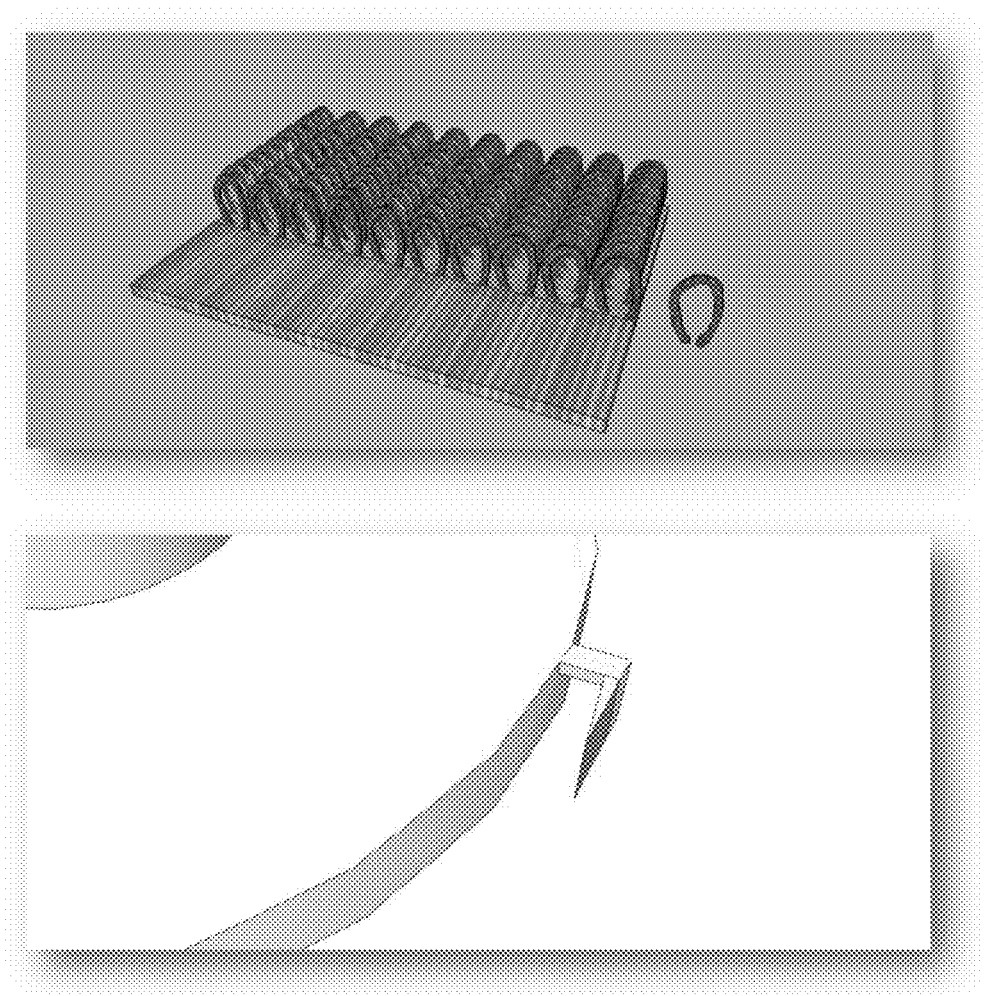
FIG. 17-18 shows the brushes and the edge-cutting member.
Figure 18:
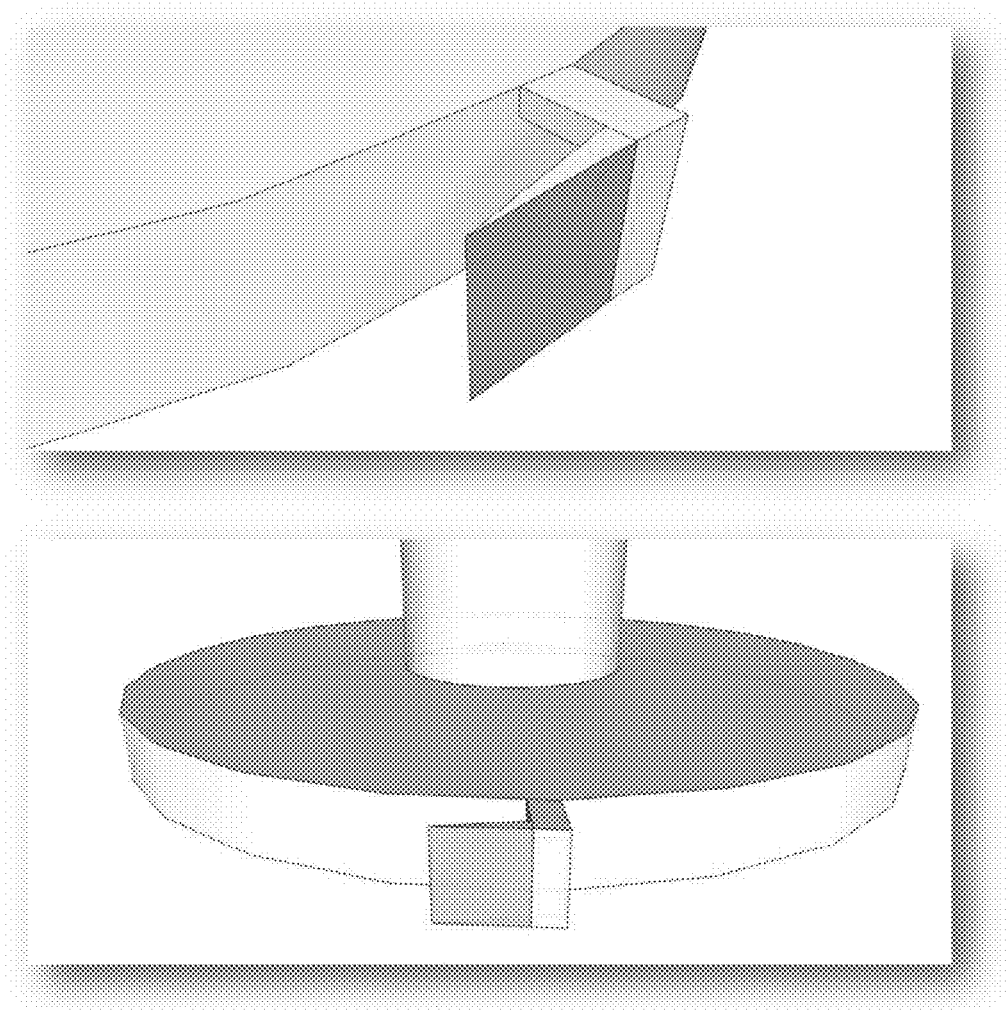
Figure 19:
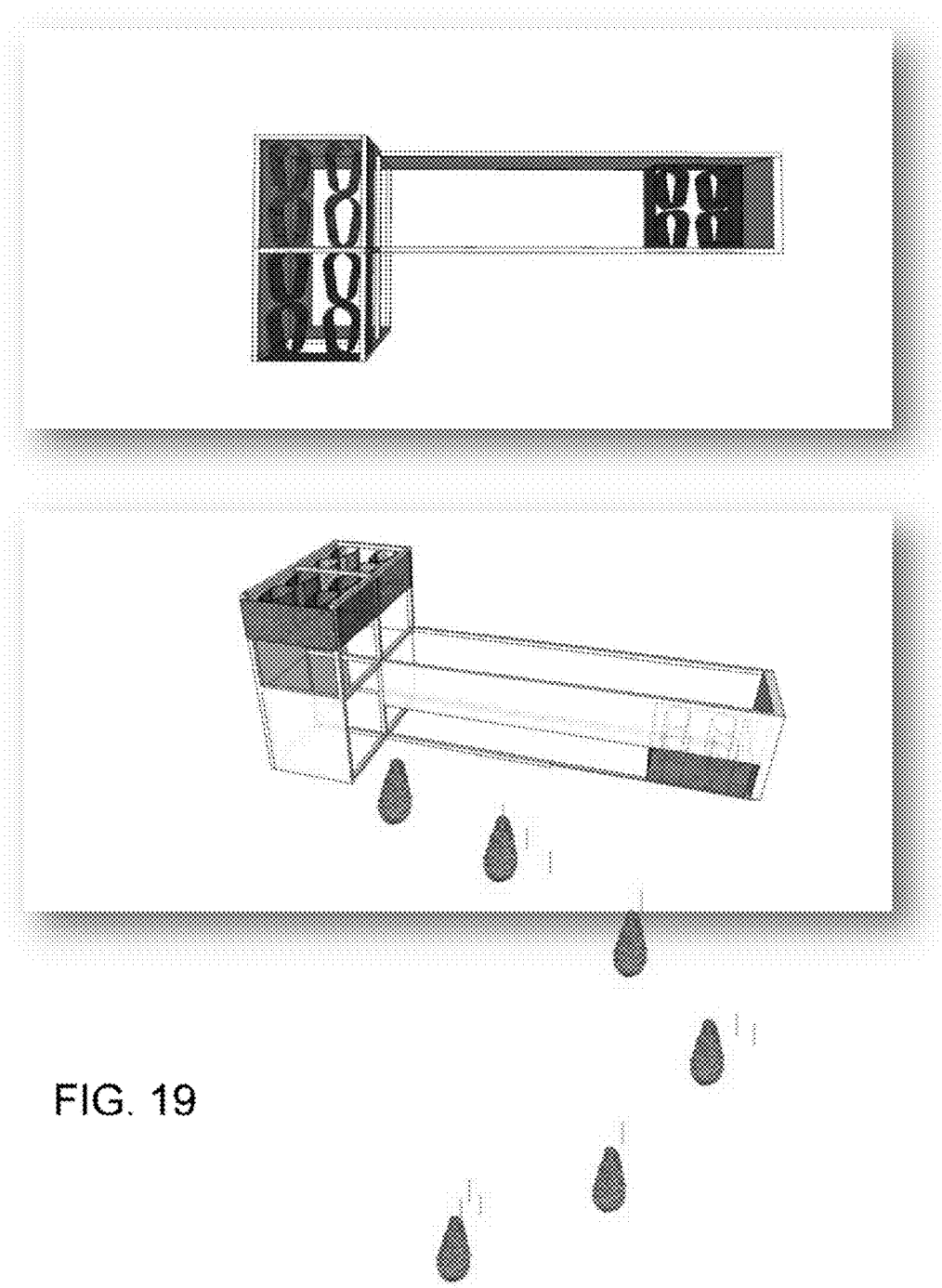
FIG. 19 shows how the cactus is distributed to the edge-cutting member and how the product will leave the conveyor.
Figure 20:
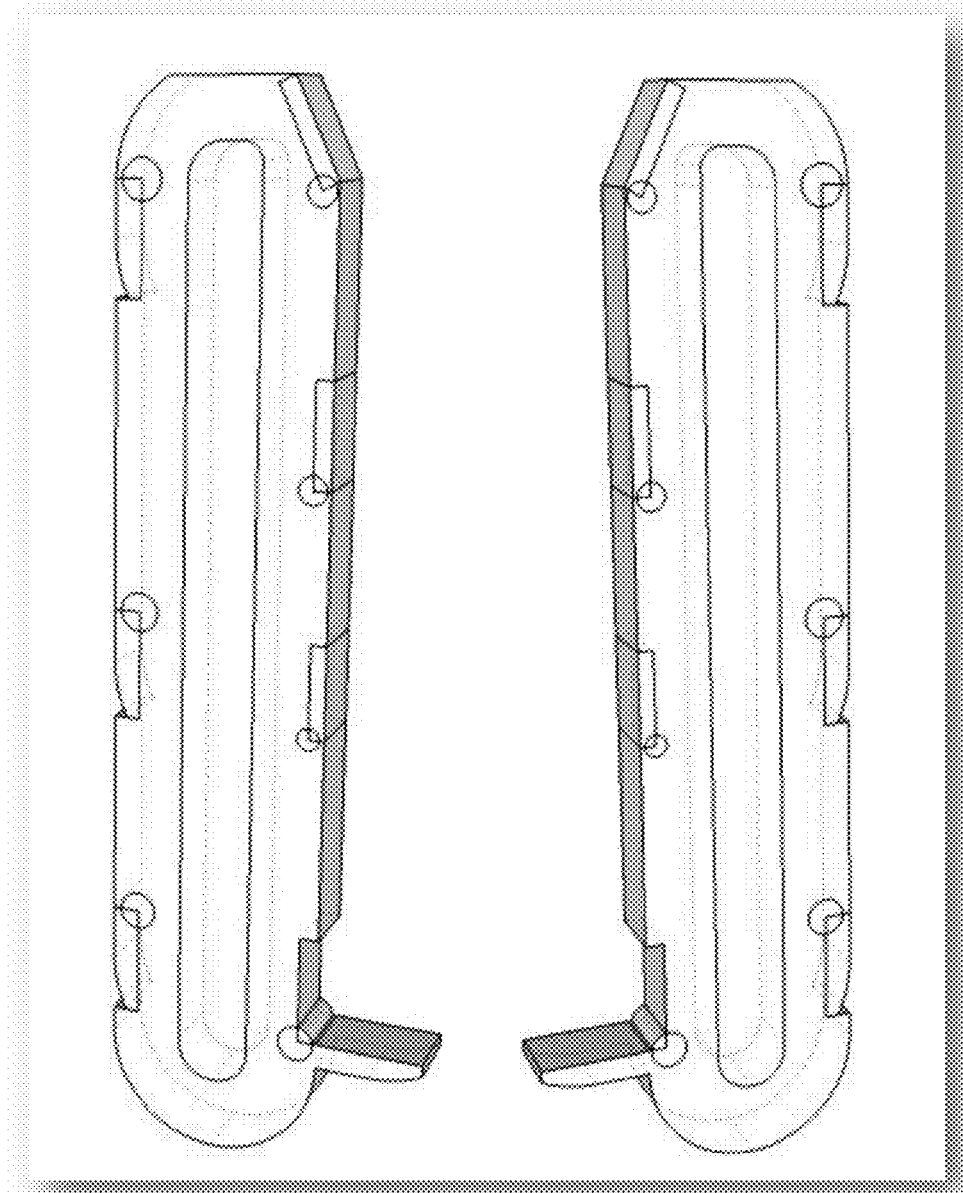
FIG. 20-22 shows the cactus-loader and its internal mechanism.
Figure 21:
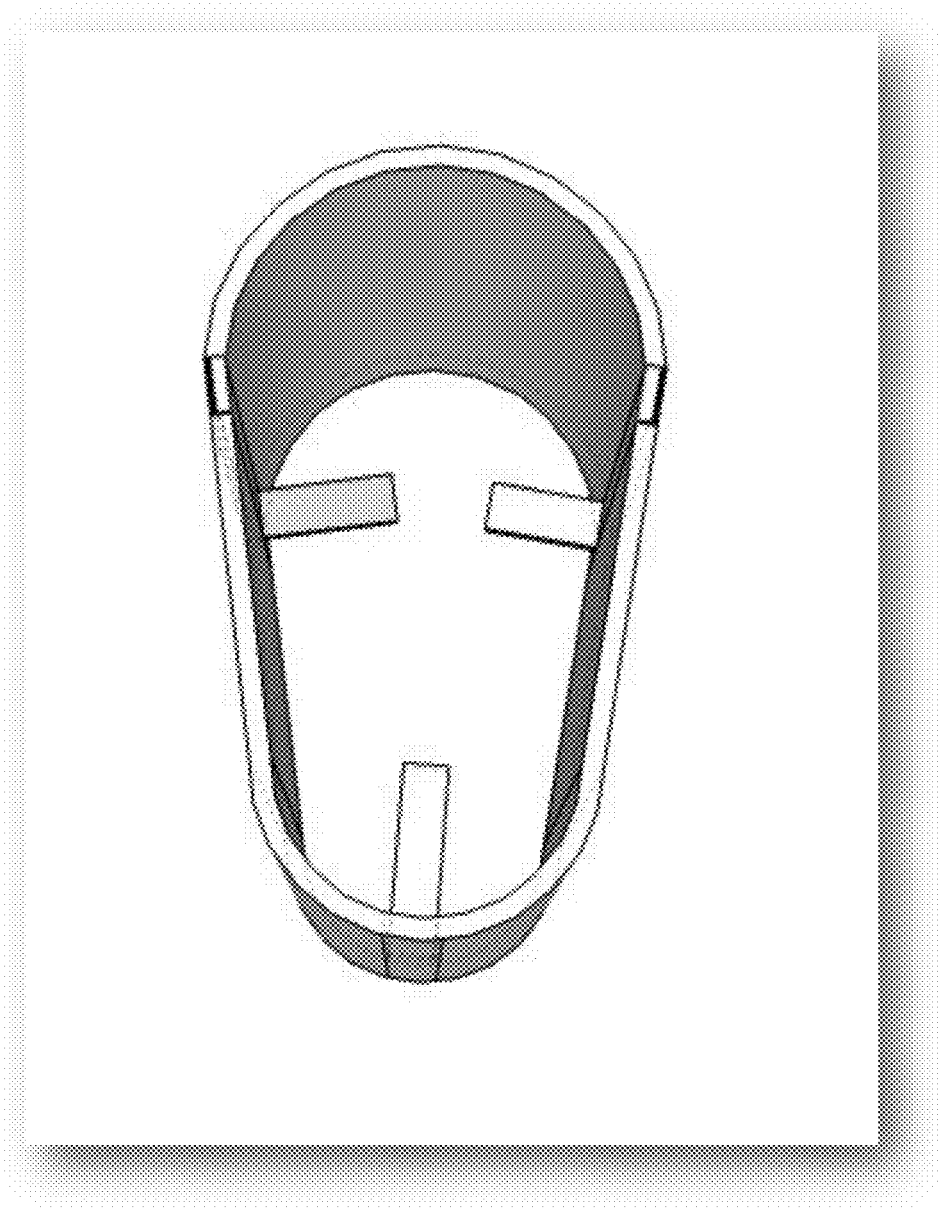
Figure 22:
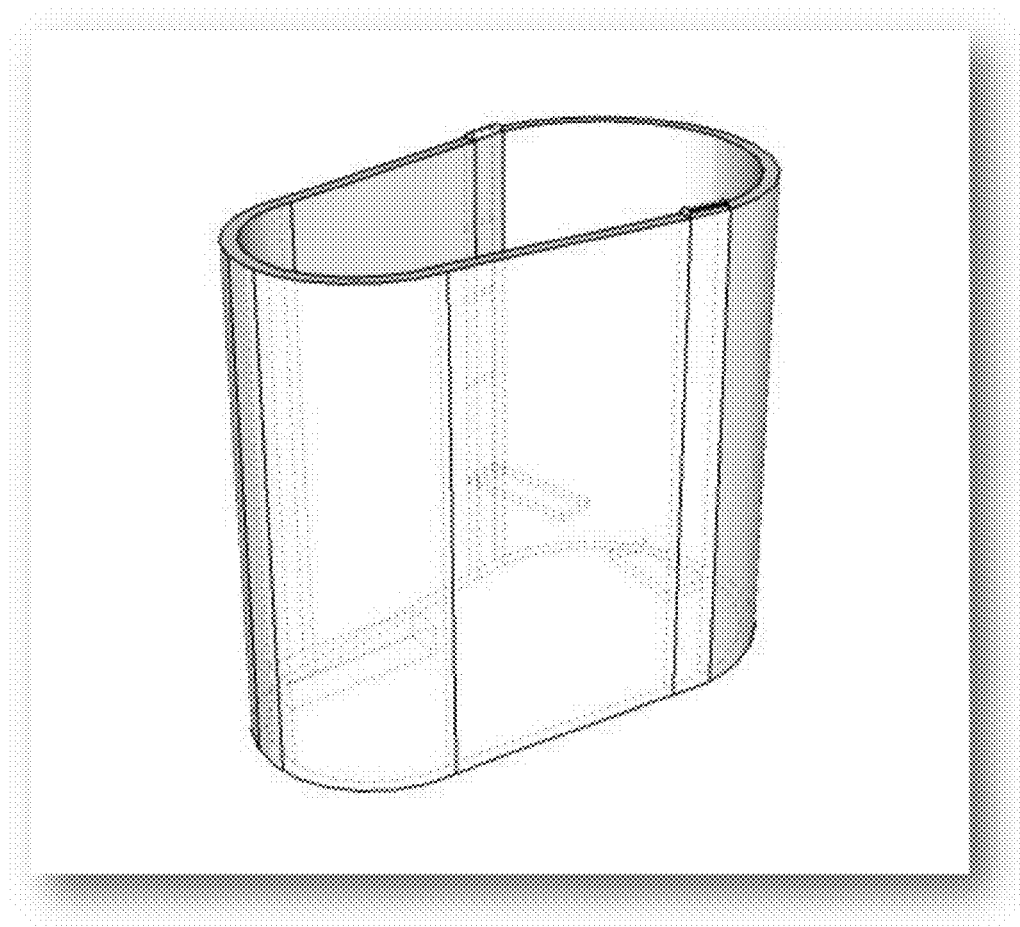
Figure 23:
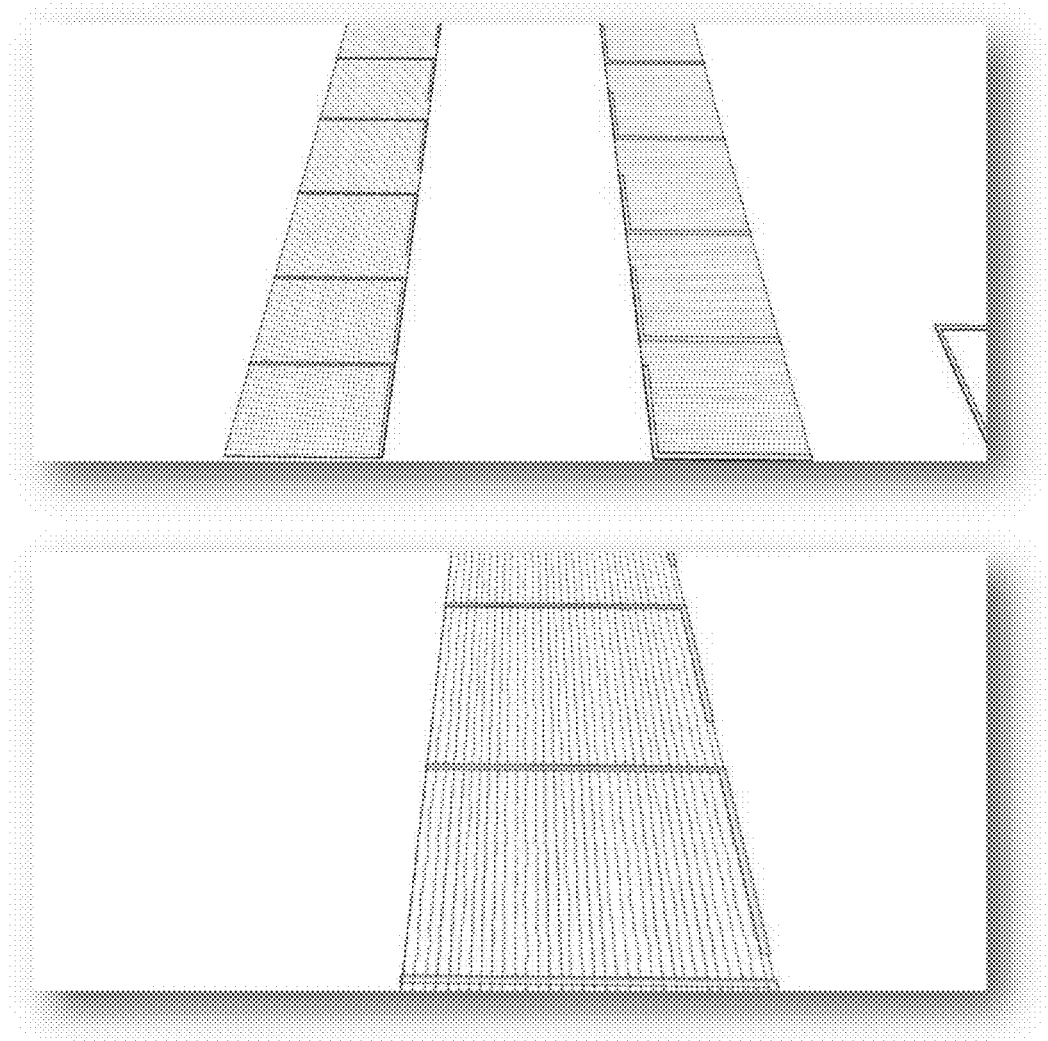
FIG. 23-24 shows the bands and plastic thread in the shape of an "L", which helps in transporting the cactus.
Figure 24:
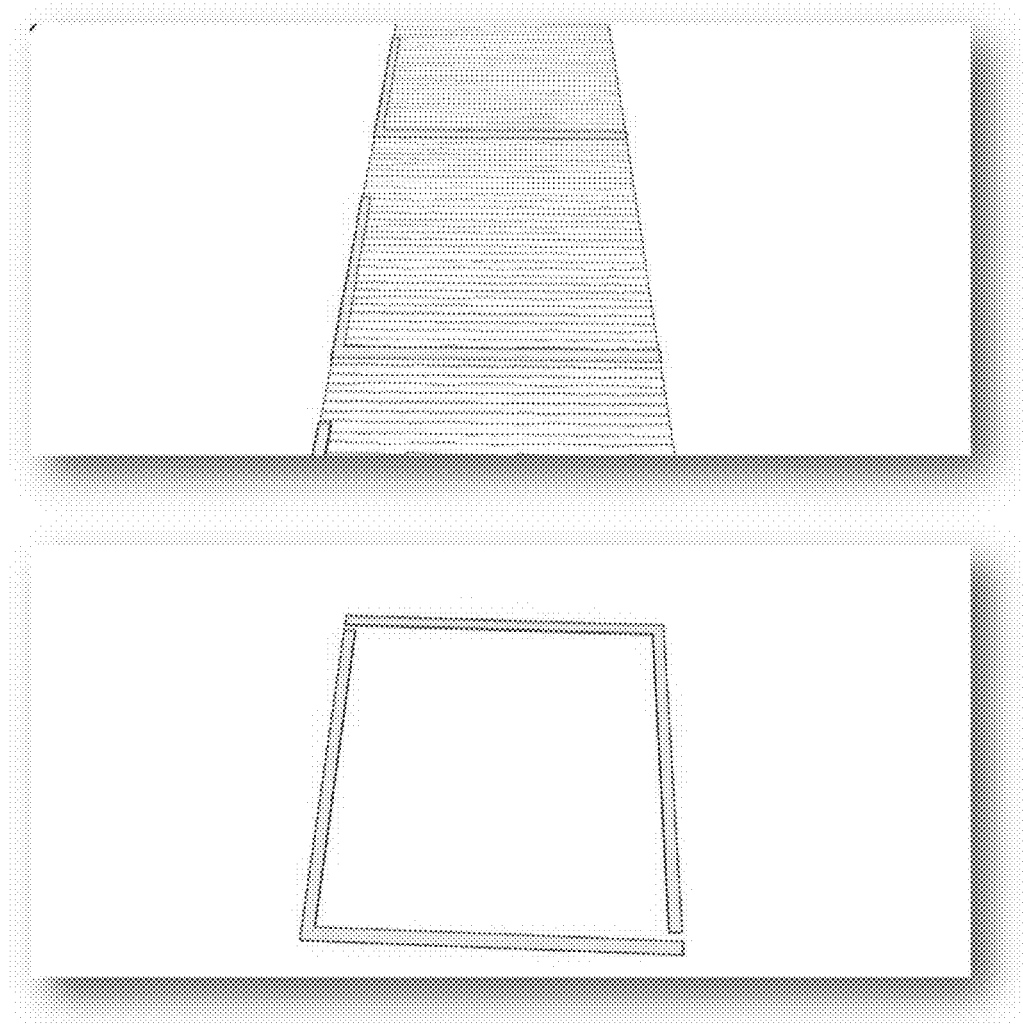
Figure 25:
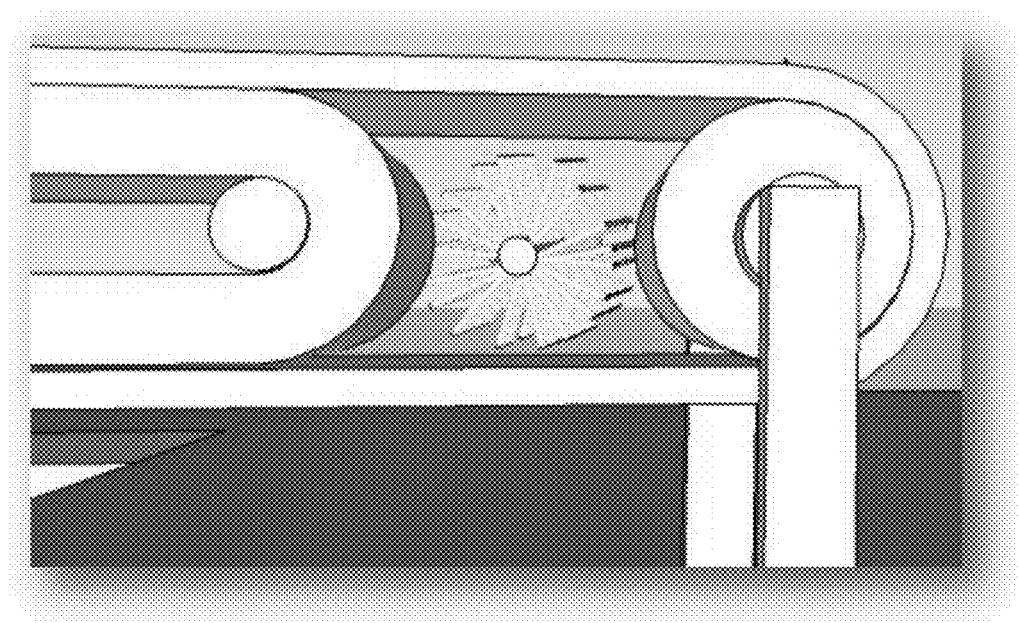
FIG. 25 shows a side view of the rotating brush.

Following is a list of elements corresponding to a particular element referred to herein:
100 Cactus processing system
101 Cactus stem
102 Cactus stem edge
103 Cactus stem front surface
104 Cactus stem rear surface
109 Cactus spine
110 Edge cleaning member
111 Conveyor belt
112 Conveyor belt first end
114 Cross beam
115 Wheel
120 Conveyor member
130 Lower transport conveyor
131 Lower transport conveyor first end
132 Lower transport conveyor second end
133 Lower transport conveyor open middle area
135 Lower transport conveyor belt
136 Lower transport conveyor belt open area
137 Lower transport conveyor belt upper surface
140 Lower cleaning conveyor
145 Lower brushing belt
146 Lower brushing belt middle area
150 Upper transport conveyor
151 Upper transport conveyor first end
152 Upper transport conveyor second end
153 Upper transport conveyor open middle area
155 Upper transport conveyor belt
156 Upper transport conveyor belt open area
157 Upper transport conveyor belt lower surface
160 Upper cleaning conveyor
165 Upper brushing belt
166 Upper brushing belt middle area
170 Brush
180 Basin
181 Basin first end
182 Basin second end
183 Basin top
185 Rail
190 Mesh screen
200 First collecting box
210 Second collecting box
220 Cactus collecting box
230 Compressed air cleaning system
231 Compressed air nozzle
300 Knife
301 First loading box
302 Second loading box
303 Third loading box
305 Stem tube
306 Stem tube bottom aperture
310 Positioning box
320 Cactus loader
330 Dicing, cutting, shredding, or chopping system
331 Bladed roller
332 Adjustment wheel
340 Brush
350 Rotating brush
360 Angular ledge Referring now to FIG. 1-25, the present invention features a cactus processing system (100) for removing spines from cactus stems. In some embodiments, the system (100) comprises a free-standing edge cleaning member (110). In some embodiments, the edge cleaning member (110) is designed to remove cactus spines (109) from an outer periphery of a cactus stem edge (102) of a cactus stem (101).

In some embodiments, the system (100) comprises a power supply and a control system. Power supplies and control systems are well known to those or ordinary skill in the art.

In some embodiments, the system (100) comprises a free-standing conveyor member (120) comprising a lower transport conveyor (130) having a lower transport conveyor first end (131), a lower transport conveyor second end (132), and a lower transport conveyor open middle area (133) between the lower transport conveyor first end (131) and the lower transport conveyor second end (132). In some embodiments, a high open area mesh lower transport conveyor belt (135) is located on the lower transport conveyor (130) and surrounds the lower transport conveyor open middle area (133). In some embodiments, high open area is greater than 90 percent open area. In some embodiments, high open area is greater than 95 percent open area. In some embodiments, high open area is greater than 98 percent open area. In some embodiments, high open area is greater than 99 percent open area.

In some embodiments, the lower transport conveyor (130) is designed to transport the cactus stem (101) from the lower transport conveyor first end (131) to the lower transport conveyor second end (132). In some embodiments, the lower transport conveyor belt (135) is designed to provide support to the cactus stem (101) while providing access to at least ninety percent of a cactus stem rear surface (104) via the lower transport conveyor belt open area (136).

In some embodiments, the system (100) comprises a free-standing conveyor member (120) comprising a lower cleaning conveyor (140) located entirely inside the lower transport conveyor open middle area (133). In some embodiments, a lower brushing belt (145) is located on the lower cleaning conveyor (140). In some embodiments, the lower brushing belt (145) is designed to interface with a cactus stem rear surface (104) on the lower transport conveyor belt (135) to remove cactus spines (109). In some embodiments, the lower brushing belt (145) traverses a direction opposed to the lower transport conveyor belt (135).

In some embodiments, the system (100) comprises a free-standing conveyor member (120) comprising an upper transport conveyor (150) having an upper transport conveyor first end (151), an upper transport conveyor second end (152), and an upper transport conveyor open middle area (153) between the upper transport conveyor first end (151) and the upper transport conveyor second end (152). In some embodiments, a high open area mesh upper transport conveyor belt (155) is located on the upper transport conveyor (150) and surrounds the upper transport conveyor open middle area (153).

In some embodiments, the upper transport conveyor (150) is designed to transport the cactus stem (101) from the upper transport conveyor first end (151) to the upper transport conveyor second end (152). In some embodiments, the upper transport conveyor belt (155) is designed to provide support to the cactus stem (101) while providing access to at least ninety percent of a cactus stem front surface (103) via the upper transport conveyor belt open area (156).

In some embodiments, the system (100) comprises a free-standing conveyor member (120) comprising an upper cleaning conveyor (160) located entirely inside the upper transport conveyor open middle area (153). In some embodiments, an upper brushing belt (165) is located on the upper cleaning conveyor (160). In some embodiments, the upper brushing belt (165) is designed to interface with a cactus stem front surface (103) on the upper transport conveyor belt (155) to remove cactus spines (109). In some embodiments, the upper brushing belt (165) traverses a direction opposed to the upper transport conveyor belt (155).

In some embodiments, a lower transport conveyor belt upper surface (137) is moving a same direction as an upper transport conveyor belt lower surface (157). In some embodiments, the cactus stem (101) is held between the lower transport conveyor belt (135) and the upper transport conveyor belt (155). In some embodiments, needles from the cactus stem (101) are removed via the lower brushing belt (145) and the upper brushing belt (165). In some embodiments, the lower brushing belt (145) and the upper brushing belt (165) each comprise a plurality of U-shaped brushes (170) located thereon. In some embodiments, the brushes (170) are flexible. In some embodiments, the brushes (170) are semi-rigid.

In some embodiments, the system (100) comprises an open basin (180) located on a ground surface having a basin first end (181) and a basin second end (182). In some embodiments, the basin (180) comprises a rail (185) longitudinally located over an open basin top (183) from the basin first end (181) to the basin second end (182). In some embodiments, a mesh screen (190) is slidably located on the rail (185). In some embodiments, the mesh screen (190) perpendicularly sets in the basin (180) for straining solids from collected sludge. In some embodiments, the solids are strained out of the basin (180) and scooped out on the basin first end (181) or the basin second end (182) via manual manipulation of the mesh screen (190). In some embodiments, the movement of the mesh screen (190) is automated.

In some embodiments, the system (100) comprises a first collecting box (200) located on the ground surface next to the basin first end (181) and a second collecting box (210) located on the ground surface next to the basin second end (182). In some embodiments, the first collecting box (200) and the second collecting box (210) are designed to catch the solids removed from the basin (180).

In some embodiments, the system (100) comprises a cactus collecting box (220) located on the ground surface next to the lower transport conveyor second end (132). In some embodiments, the cactus collecting box (220) is designed to collect cleaned cactus stems (101) falling from the conveyor member (120).

In some embodiments, the system (100) comprises a compressed air cleaning system (230) comprising a compressed air supply and a plurality of compressed air nozzles (231). In some embodiments, the plurality of compressed air nozzles (231) is located in multiple locations within a lower brushing belt middle area (146) and an upper brushing belt middle area (166) for cleaning the lower brushing belt (145), the upper brushing belt (165), the lower transport conveyor belt (135), and the upper transport conveyor belt (155).

In some embodiments, the edge cleaning member (110) comprises a conveyor belt (111) located thereon. In some embodiments, a cactus stem (101) is placed on a conveyor belt first end (112). In some embodiments, the conveyor belt (111) transports the cactus stem (101) through the edge cleaning member (110) to remove cactus spines (109) from the cactus stem (101). In some embodiments, the edge cleaning member (110) further comprises a cross beam (114) perpendicularly mounted above the conveyor belt (111). In some embodiments, a plurality of abrasive wheels (115) is rotatably located on the structure projecting toward the conveyor belt (111). In some embodiments, the abrasive wheels (115) are designed to trace the outer periphery of the cactus stem edge (102) to remove the cactus spines (109) as the cactus stem (101) passes by on the conveyor belt (111).

In some embodiments, the edge cleaning member (110) comprises a conveyor belt (111) located thereon. In some embodiments, the edge cleaning member (110) comprises a laser cutter located thereon. In some embodiments, the laser cutter is designed to trace the outer periphery of the cactus stem edge (102) to remove the cactus spines (109).

In some embodiments, the edge cleaning member (110) comprises at least one rotating circular plate and a filer located thereon. In some embodiments, the filer is located tangent to an outer periphery of the rotating circular plate. In some embodiments, the cactus stem (101) is located on the rotating circular plate. In some embodiments, the rotating circular plate rotates the cactus stem (101) against the filer to remove the cactus spines (109) from the outer periphery of the cactus stem edge (102).

Additional Detail of Preferred Embodiments

The first loading box (301) contains a box of tubes or nopal boots. The first loading box (301) is waiting to be filled with cactus in the four tubes which have a structure with a sort of extension attached to the inside that contains cactus. Once filled, this box will slide down into the cactus loader.

The second loading box (302) contains a box of tubes or nopal boots. The second loading box (302) is waiting to be filled with cactus in the four tubes after the first loading box (301) is filled. The second loading box (302) is placed upstream from the operator and pending filling each of the tubes from the box.

The third loading box (303) contains a box of tubes or nopal boots. The third loading box (303) is shown in the drawing below the other two boxes. A mechanical device is shown that moves the tubes so that they release cactus stems. It will release at a point such that the same mechanism will draw it to the next step that will continue the cycle. The cactus stem will make the edge of the nopal remover (desorillador) or edge cleaning member. When the entire contents of the cartridge tubes is emptied, the box is mechanically prepared for a climb where the box is moved to position becoming the second loading box (302).

The present invention features a space for filling the first loading box (301). Once filled, this box moves downward, then the second loading box (302) becomes the first loading box (301) and in turn this will occupy that previous space to continue the process of emptying the nopal to the remover shore nopal (desorillador). In turn, this will continue the process of movement of the boxes up to its original position in the cycle.

The stem tube is shown cactus shaped and comprises about three sides with rounded corners which will help sustain or hold the nopales. The stem tube likewise can release the nopales in a satisfactory time and position when desired.

A positioning box (310) is used to position the loading boxes from left to right for positioning nopales to drop at certain points on the machine or directly behind the edge of nopal remover (desorillador or desorilladores). This becomes especially significant based on the size of the machine.

The present invention features the edge cleaning member or (desorillador) with at least one knife to remove all the needles on the edge of the cactus. Once removed, the cactus will move on to the conveyor belts.

Upper rollers and lower rollers will rotate the two wire mesh bands to move the cactus toward the end.

A rotating brush will help remove the rough edges and debris sticking to the brushes, this is the only part of the machine that cannot be connected to a band or powered mechanism. It is free spinning and allowed to follow the movement of the spun bands according to the pressure exerted each of these bands.

Inside upper rollers and lower rollers rotate the bands of brushes. The bands of brushes are in a shape of a "U" as shown in the drawings. In some embodiments, the bands are rounded. In some embodiments, the bands are angular.

A water trough collects debris and rough nopal pieces in the water and these in turn are removed by the strainer. The strainer will keep moving from left to right of the container or tray of water and in turn deposit the wastes in their respective boxes. At an end of a work day, the machine will be cleaned via the air pump and a water washer.

Windows or air vents come from the air pump via hoses.

A brush on the end of the conveyors contains broom bristles which will help ensure that thorns do not go inside the machine. This is the only part of the machine that will not be covered as there is a cover that encloses the conveyors.

An adjusting wheel manipulates or rotates the blades of the bladed roller. Cactus enters the bladed roller when the cactus is completely clean. It goes through this roller, then out. The cactus can be chopped or shredded.

Each and every one of the parts are connected to each other including the boxes, the remover (desorillador), bands, waste strainer, air pump and finally the roll to chop or crack the nopal. The whole machine is covered with a structure and there are two spun bands.

In some embodiments, a machine for clean nopales can process five or more in a single line. In some embodiments, for a larger machine, an automated system is necessary to supply a cactus cleaning line of five or more nopales.

Pipe Cactus and Charger System Boxes.

It is a tube that can be any material, but preferably a material which does not attach any waste cactus or other materials that may be harmful to ingest. This tube has a kind of chain which has some parts that protrude into the tube which will help sustain the cactus when a piece is loaded and every time the little pieces go for a click, the click is going to release the other small parts that help put the other cactus pieces inside until each tube box is full. When the box is full, each cactus can be freed with a button or a lever. This will release downwardly. Then the operator pulls the other box to fill it with cactus. While another box rises up to where the latter was to take the place while the operator fills these boxes, the box with the nopales is releasing the nopales one at a time in an appropriate area of the band to be processed or cleaned. This is repeated until the desired amount of cactus is cleaned.

Edge Cleaner.

In some embodiments, the edge cleaner can have sanding edges. In some embodiments, the edge cleaner has a disc with one or more small knives. In some embodiments, even a single small knife would cut a small portion from the cactus itself along with the needles. The edge cleaner will have to be well protected to avoid accidents. In some embodiments, the edge cleaner will also have a part to hold the cactus so it will not lift or be tossed. In some embodiments, the edge cleaner must be very well covered to prevent the spines reach the operator.

Bottom Conveyor.

The bottom conveyor is composed of several threads which go horizontally and has a thicker kind of material on top of the belt that will form an "L".

Top Conveyor.

The top conveyor is composed of several threads which go vertically and has a thicker kind of material on top of the belt that will form an "L".

The nopal lies between the two conveyor belts during the last leg of the cleaning process. The two "L" shaped pieces form a kind of cell that can help the nopal not scroll, move, or hurt anyone by being loose. In some embodiments, the threads of the band will have flexibility between them and will be flexible and movable which will allow the brush to remove the thorns easier creating a perfect cleaning for the nopal.

Brush Cleaner.

This brush will provide preventative maintenance to the cactus brush cleaner by removing debris. There can be one on each end of the cactus cleaner.

Windows.

In some embodiments, the system has movable window openings to allow access to the cactus and equipment for cleaning.

Oval or Horseshoe Shaped Brush on Conveyor.

In some embodiments, the brushes on the conveyor belts are oval or horseshoe shaped.

In some embodiments, the edge cleaning member (110) has a conveyor belt (111) located thereon. In some embodiments, the cactus stem (101) is placed on a conveyor belt first end (112). In some embodiments, the conveyor belt (111) transports the cactus stem (101) through the edge cleaning member (110) to remove cactus spines (109) from the cactus stem (101). In some embodiments, the edge cleaning member (110) further comprises a cross beam (114) perpendicularly mounted above the conveyor belt (111). In some embodiments, a plurality of wheels (115) is rotatably located on the structure projecting toward the conveyor belt (111). In some embodiments, the wheels (115) are designed to trace the outer periphery of the cactus stem edge (102) to remove the cactus spines (109) via a knife (300) located on an outer periphery of the wheel (115) thereon as the cactus stem (101) passes by on the conveyor belt (111).

In some embodiments, the system (100) comprises a first loading box (301), a second loading box (302), and a third loading box (303). In some embodiments, a stem tube (305) is located in each of the first loading box (301), the second loading box (302), and the third loading box (303). In some embodiments, the stem tube (305) comprises a shape of a cactus stem (101) outer periphery. In some embodiments, a stop is located at a stem tube bottom aperture (306) for temporarily retaining a cactus stem (101) within the stem tube (305);

In some embodiments, the first loading box (301) is in a loading position with respect to the cactus stem (101). In some embodiments, the second loading box (302) is in a stand-by position close to and located on a same plane as the first loading box (301) with respect to the cactus stem (101). In some embodiments, the third loading box (303) is in a loaded position located on a plane below the first loading box (301) and the second loading box (302) for disposing the cactus stem onto the edge cleaning member (110) for processing. In some embodiments, the first loading box (301), the second loading box (302), and the third loading box (303) rotate in a cycle of filling and emptying the cactus stems (101) onto the edge cleaning member (110) for processing. In some embodiments, the first loading box (301), the second loading box (302), and the third loading box (303) are rotatably located in a cactus loader (320).

In some embodiments, a positioning box (310) is located perpendicularly with respect to the edge cleaning member (110). In some embodiments, the third loading box (303) is located in the positioning box (310) for positioning the cactus stem (101) in a desired position with respect to the conveyor belt (111).

In some embodiments, a dicing, cutting, shredding, or chopping system (330) is located on the system (100) next to the lower transport conveyor second end (132) and the upper transport conveyor second end (152). In some embodiments, the dicing, cutting, shredding, or chopping system (330) comprises a bladed roller (331) rotatably adjustable via an adjustment wheel (332).

In some embodiments, a brush (340) is located on the system (100) next to the lower transport conveyor second end (132) and the upper transport conveyor second end (152).

In some embodiments, an upper free spinning rotating brush (350) is located inside the upper transport conveyor belt (155) and outside the upper brushing belt (165) close to the upper transport conveyor second end, (152) for cleaning the belts. In some embodiments, a lower free spinning rotating brush (350) is located inside the lower transport conveyor belt (135) and outside the lower brushing belt (145) close to the lower transport conveyor second end (132) for cleaning the belts.

In some embodiments, a lower angular ledge (360) is located on a lower transport conveyor belt (135). In some embodiments, an upper angular ledge (360) is located on an upper transport conveyor belt (155). In some embodiments, the upper angular ledge (360) and the lower angular ledge (360) together catch the cactus stem (101) on one or more of the cactus stem edges (102) for transport via the belts.

As used herein, the term "about" refers to plus or minus 10% of the referenced number.

The disclosures of the following U.S. Patents are incorporated in their entirety by reference herein: U.S. Pat. No. D 296,560; U.S. Pat. No. 6,796,224; U.S. Pat. No. 6,016,626; U.S. Pat. No. 5,651,212; U.S. Pat. No. 5,293,714; U.S. Pat. No. 5,196,036; U.S. Pat. No. 4,240,902; and U.S. Pat. No. 1,394,162.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. in some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A cactus processing system (100) for removing spines from cactus stems, wherein the system (100) comprises:
   (a) a free-standing edge cleaning member (110), wherein the edge cleaning member (110) is adapted to remove cactus spines (109) from an outer periphery of a cactus stem edge (102) of a cactus stem (101);
   (b) a free-standing conveyor member (120) comprising:
      (i) a lower transport conveyor (130) having a lower transport conveyor first end (131), a lower transport conveyor second end (132), and a lower transport conveyor open middle area (133) between the lower transport conveyor first end (131) and the lower transport conveyor second end (132), wherein a high open area mesh lower transport conveyor belt (135) is located on the lower transport conveyor (130) and surrounds the lower transport conveyor open middle area (133),
      wherein the lower transport conveyor (130) is designed to transport the cactus stem (101) from the lower transport conveyor first end (131) to the lower transport conveyor second end (132), wherein the lower transport conveyor belt (135) is designed to provide support to the cactus stem (101) while providing access to at least ninety percent of a cactus stem rear surface (104) via a lower transport conveyor belt open area (136),
      (ii) a lower cleaning conveyor (140) located entirely inside the lower transport conveyor open middle area (133), wherein a lower brushing belt (145) is located on the lower cleaning conveyor (140), wherein the lower brushing belt (145) is designed to interface with the cactus stem rear surface (104) on the lower transport conveyor belt (135) to remove cactus spines (109), wherein the lower brushing belt (145) traverses a direction opposed to the lower transport conveyor belt (135),
      (iii) an upper transport conveyor (150) having an upper transport conveyor first end (151), an upper transport conveyor second end (152), and an upper transport conveyor open middle area (153) between the upper transport conveyor first end (151) and the upper transport conveyor second end (152), wherein a high open area mesh upper transport conveyor belt (155) is located on the upper transport conveyor (150) and surrounds the upper transport conveyor open middle area (153),
      wherein the upper transport conveyor (150) is designed to transport the cactus stem (101) from the upper transport conveyor first end (151) to the upper transport conveyor second end (152), wherein the upper transport conveyor belt (155) is designed to provide support to the cactus stem (101) while providing access to at least ninety percent of a cactus stem front surface (103) via an upper transport conveyor belt open area (156), and
      (iv) an upper cleaning conveyor (160) located entirely inside the upper transport conveyor open middle area (153), wherein an upper brushing belt (165) is located on the upper cleaning conveyor (160), wherein the upper brushing belt (165) is designed to interface with the cactus stem front surface (103) on the upper transport conveyor belt (155) to remove cactus spines (109), wherein the upper brushing belt (165) traverses a direction opposed to the upper transport conveyor belt (155),
      wherein a lower transport conveyor belt upper surface (137) is moving a same direction as an upper transport conveyor belt lower surface (157), wherein the cactus stem (101) is held between the lower transport conveyor belt (135) and the upper transport conveyor belt (155), wherein cactus spines (109) from the cactus stem (101) are removed via the lower brushing belt (145) and the upper brushing belt (165), wherein the lower brushing belt (145) and the upper brushing belt (165) each comprise a plurality of U-shaped brushes (170) located thereon;
   (c) an open basin (180) located on a ground surface having a basin first end (181) and a basin second end (182), wherein the basin (180) comprises a rail (185) longitudinally located over an open basin top (183) from the basin first end (181) to the basin second end (182), wherein a mesh screen (190) is slidably located on the rail (185), wherein the mesh screen (190) perpendicularly sets in the basin (180) for straining solids from collected sludge, wherein the solids are strained out of the basin (180) and scooped out on the basin first end (181) or the basin second end (182) via manual manipulation of the mesh screen (190);
   (d) a first collecting box (200) located on the ground surface next to the basin first end (181) and a second collecting box (210) located on the ground surface next to the basin second end (182), wherein the first collecting box (200) and the second collecting box (210) are designed to catch the solids removed from the basin (180);
   (e) a cactus collecting box (220) located on the ground surface next to the lower transport conveyor second end (132), wherein the cactus collecting box (220) is designed to collect cleaned cactus stems (101) falling from the conveyor member (120); and
   (f) a compressed air cleaning system (230) comprising a compressed air supply and a plurality of compressed air nozzles (231), wherein the plurality of compressed air nozzles (231) is located in multiple locations within a lower brushing belt middle area (146) and an upper brushing belt middle area (166) for cleaning the lower brushing belt (145), the upper brushing belt (165), the lower transport conveyor belt (135), and the upper transport conveyor belt (155).

2. The system (100) of claim 1, wherein the edge cleaning member (110) has at least one rotating circular plate and a filer located thereon, wherein the filer is located tangent to an outer periphery of the rotating circular plate, wherein the cactus stem (101) is located on the rotating circular plate, wherein the rotating circular plate rotates the cactus stem (101) against the filer to remove the cactus spines (109) from the outer periphery of the cactus stem edge (102).

3. The system (100) of claim 1, wherein the system (100) comprises a first loading box (301), a second loading box (302), and a third loading box (303), wherein a stem tube (305) is disposed in each of the first loading box (301), the second loading box (302), and the third loading box (303), wherein the stem tube (305) comprises a shape of a cactus stem (101) outer periphery, wherein a stop is disposed at a stem tube bottom aperture (306) for temporarily retaining a cactus stem (101) within the stem tube (305);
   wherein the first loading box (301) is in a loading position with respect to the cactus stem (101), wherein the second loading box (302) is in a stand-by position proximal to and disposed on a same plane as the first loading box (301) with respect to the cactus stem (101), wherein the third loading box (303) is in a loaded position disposed on a plane below the first loading box (301) and the second loading box (302) for disposing the cactus stem onto the edge cleaning member (110) for processing, wherein the first loading box (301), the second loading box (302), and the third loading box (303) rotate in a cycle of filling and emptying the cactus stems (101) onto the edge cleaning member (110) for processing, wherein the first loading box (301), the second loading box (302), and the third loading box (303) are rotatably disposed in a cactus loader (320).

4. The system (100) of claim 3, wherein a positioning box (310) is disposed perpendicularly with respect to the edge cleaning member (110), wherein the third loading box (303) is disposed in the positioning box (310) for positioning the cactus stem (101) in a desired position with respect to the conveyor belt (111).

5. The system (100) of claim 1, wherein a dicing, cutting, shredding, or chopping system (330) is disposed on the system (100) adjacent to the lower transport conveyor second end (132) and the upper transport conveyor second end (152), wherein the dicing, cutting, shredding, or chopping system (330) comprises a bladed roller (331) rotatably adjustable via an adjustment wheel (332).

6. The system (100) of claim 1, wherein a brush (340) is disposed on the system (100) adjacent to the lower transport conveyor second end (132) and the upper transport conveyor second end (152).

7. The system (100) of claim 1, wherein an upper free spinning rotating brush (350) is disposed inside the upper transport conveyor belt (155) and outside the upper brushing belt (165) proximal to the upper transport conveyor second end (152) for cleaning the belts, wherein a lower free spinning rotating brush (350) is disposed inside the lower transport conveyor belt (135) and outside the lower brushing belt (145) proximal to the lower transport conveyor second end (132) for cleaning the belts.

8. The system (100) of claim 1, wherein a lower angular ledge (360) is disposed on a lower transport conveyor belt (135), wherein an upper angular ledge (360) is disposed on an upper transport conveyor belt (155), wherein the upper angular ledge (360) and the lower angular ledge (360) together catch the cactus stem (101) on one or more of the cactus stem edges (102) for transport via the belts.

* * * * *